(12) United States Patent
Kurose et al.

(10) Patent No.: US 9,920,874 B2
(45) Date of Patent: Mar. 20, 2018

(54) LINKAGE ROD INCLUDING LIMITED-DISPLACEMENT FLEXIBLE MECHANISM

(71) Applicant: NEC Corporation, Tokyo (JP)

(72) Inventors: Minoru Kurose, Tokyo (JP); Kazuo Hamada, Tokyo (JP); Yoshihiko Katsuyama, Tokyo (JP); Takashi Kamizono, Tokyo (JP); Takuro Kobayashi, Tokyo (JP); Naoto Tanimichi, Tokyo (JP); Tsui Happy, Castaic, CA (US)

(73) Assignee: NEC Corporation, Tokyo (JP)

( * ) Notice: Subject to any disclaimer, the term of this patent is extended or adjusted under 35 U.S.C. 154(b) by 6 days.

(21) Appl. No.: 14/813,410

(22) Filed: Jul. 30, 2015

(65) Prior Publication Data

US 2017/0030513 A1  Feb. 2, 2017

(51) Int. Cl.
| | |
|---|---|
| *F16M 11/24* | (2006.01) |
| *G02B 7/18* | (2006.01) |
| *G02B 7/183* | (2006.01) |
| *F16F 15/02* | (2006.01) |
| *G02B 7/182* | (2006.01) |
| *B25J 7/00* | (2006.01) |

(Continued)

(52) U.S. Cl.
CPC ............ *F16M 11/245* (2013.01); *B25J 7/00* (2013.01); *B25J 9/0042* (2013.01); *F16F 15/02* (2013.01); *F16M 11/18* (2013.01); *G02B 7/181* (2013.01); *G02B 7/182* (2013.01); *G02B 7/183* (2013.01); *G02B 7/1822* (2013.01); *G02B 7/1827* (2013.01)

(58) Field of Classification Search
CPC .... G02B 7/1822; G02B 7/1827; G02B 7/183; G02B 7/182; G02B 7/181; F16F 15/02; F16M 11/245; B25J 7/00
USPC ........................................................ 403/291
See application file for complete search history.

(56) References Cited

U.S. PATENT DOCUMENTS

| | | | | |
|---|---|---|---|---|
| 4,611,946 A | * | 9/1986 | Gebelius | ................. F16C 11/12 135/114 |
| 4,869,552 A | * | 9/1989 | Tolleson | ................ A47C 7/445 248/160 |

(Continued)

FOREIGN PATENT DOCUMENTS

| | | | | |
|---|---|---|---|---|
| EP | 0665389 A1 | * | 8/1995 | .............. F16F 15/02 |
| FR | 2945638 B1 | * | 1/2012 | ............. G02B 7/182 |

(Continued)

OTHER PUBLICATIONS

International Search Report and Written Opinion issued in corresponding International Application PCT/JP2015/004607, dated Dec. 15, 2015, 8 pages.

*Primary Examiner* — Eret C McNichols

(74) *Attorney, Agent, or Firm* — Wilmer Cutler Pickering Hale and Dorr LLP

(57) ABSTRACT

A linkage rod including a limited-displacement flexible mechanism has structural robustness and allows easy reduction in weight and size, simple production and easy operation. The linkage rod including at least one limited-displacement flexible mechanism, wherein the limited-displacement flexible mechanism comprises at least one limited-displacement flexible joint which comprises: a flexible member; and at least one bend limitation section which is arranged in parallel with the flexible member so that the bend limitation section limits a bend of the flexible member.

8 Claims, 21 Drawing Sheets

(51) Int. Cl.
*F16M 11/18* (2006.01)
*B25J 9/00* (2006.01)

(56) References Cited

U.S. PATENT DOCUMENTS

| | | | | |
|---|---|---|---|---|
| 5,102,255 A * | 4/1992 | Heinz | .................. | G02B 7/1827 403/121 |
| 5,445,471 A * | 8/1995 | Wexler | .................. | B60R 22/195 16/225 |
| 5,844,732 A * | 12/1998 | Huiban | .................. | G02B 7/182 359/224.1 |
| 6,328,047 B1 * | 12/2001 | Lee | .................. | A45B 17/00 135/15.1 |
| 6,402,329 B1 | 6/2002 | Bailly et al. | | |
| 7,063,300 B2 * | 6/2006 | Billet | .................. | G02B 7/1827 248/476 |
| 7,110,089 B2 * | 9/2006 | Mizuno | .................. | G02B 7/023 310/328 |
| 7,113,688 B2 * | 9/2006 | Calvet | .................. | G02B 7/008 359/871 |
| 7,515,359 B2 * | 4/2009 | Kugler | .................. | G02B 7/023 359/811 |
| 8,674,460 B2 * | 3/2014 | Gutierrez | .................. | B81B 7/0054 257/414 |
| 8,906,100 B2 * | 12/2014 | Jimenez | .................. | F16C 11/12 623/17.15 |
| 8,960,929 B2 * | 2/2015 | Devilliers | .................. | G02B 7/1815 359/846 |
| 8,978,480 B2 | 3/2015 | Michopoulos et al. | | |
| 9,234,561 B2 * | 1/2016 | Laurens | .................. | F16F 15/08 |
| 9,308,649 B2 * | 4/2016 | Golda | .................. | B25J 15/0085 |
| 9,381,092 B2 * | 7/2016 | Jimenez | .................. | F16C 11/12 |
| 9,410,662 B2 * | 8/2016 | Geuppert | .................. | G02B 7/005 |
| 2009/0244505 A1 * | 10/2009 | Mizuno | .................. | G02B 7/1827 355/66 |
| 2011/0188104 A1 | 8/2011 | Tachibana et al. | | |
| 2014/0307243 A1 * | 10/2014 | Sai | .................. | G02B 26/0825 355/67 |
| 2015/0077874 A1 * | 3/2015 | Naepflin | .................. | G02B 7/1822 359/872 |
| 2015/0145191 A1 * | 5/2015 | Smith | .................. | F16F 3/0873 267/141 |

FOREIGN PATENT DOCUMENTS

| | | | | |
|---|---|---|---|---|
| GB | 2441339 A * | 3/2008 | ............ | F16F 15/073 |
| JP | 2002-501222 A | 1/2002 | | |
| JP | 4372344 B2 * | 11/2009 | ............ | G02B 7/1822 |
| JP | 2010-026147 A | 2/2010 | | |
| JP | 2013-096574 A | 5/2013 | | |
| WO | WO 9922260 A1 * | 5/1999 | ............ | B64G 1/66 |
| WO | WO 2012110406 A1 * | 8/2012 | ............ | G02B 7/005 |
| WO | WO 2015120977 A1 * | 8/2015 | ............ | G02B 7/181 |

* cited by examiner

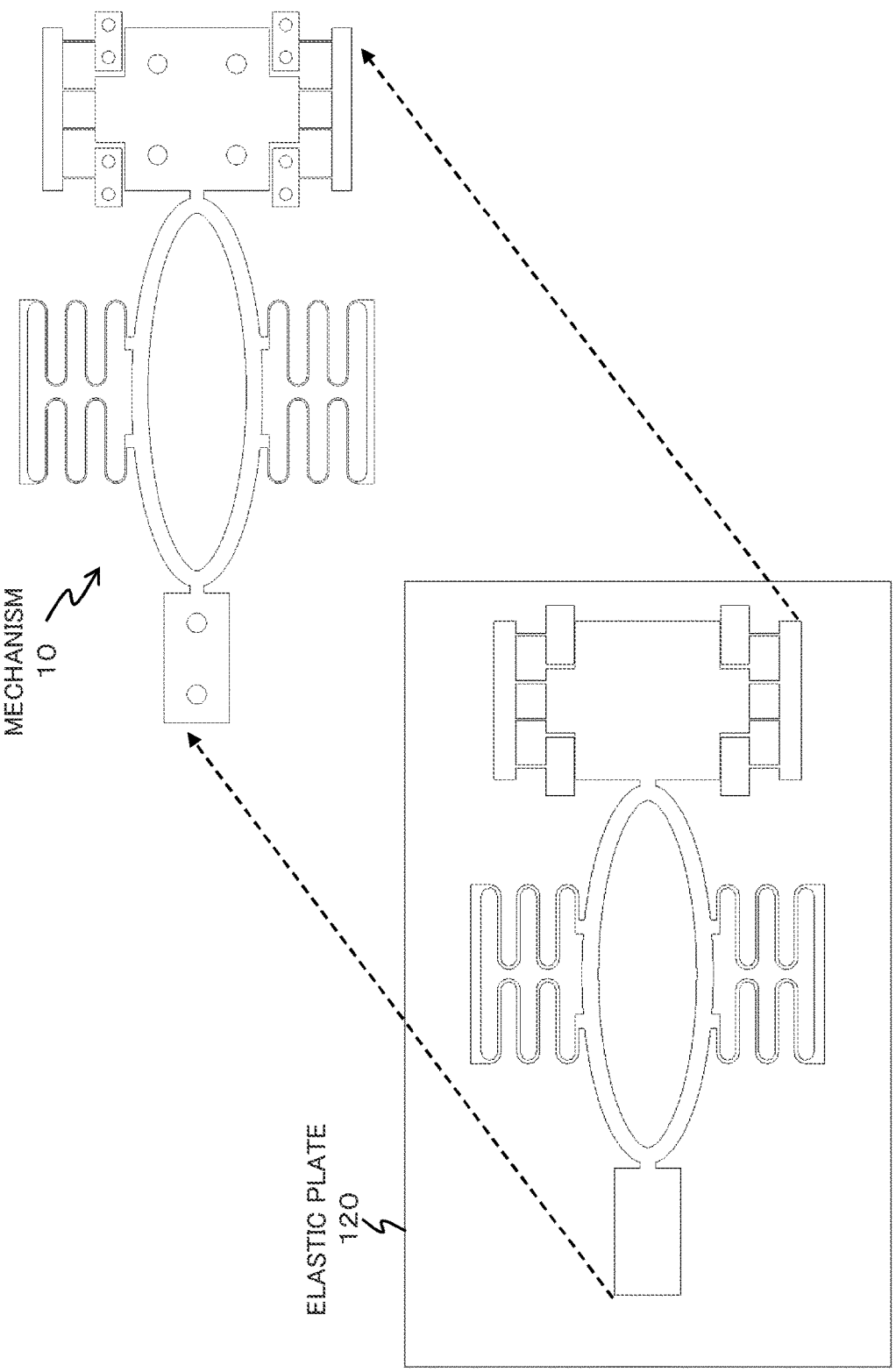
F I G. 4

FIG. 8  FIRST EXAMPLARY EMBODIMENT

SECOND EXEMPLARY EMBODIMENT

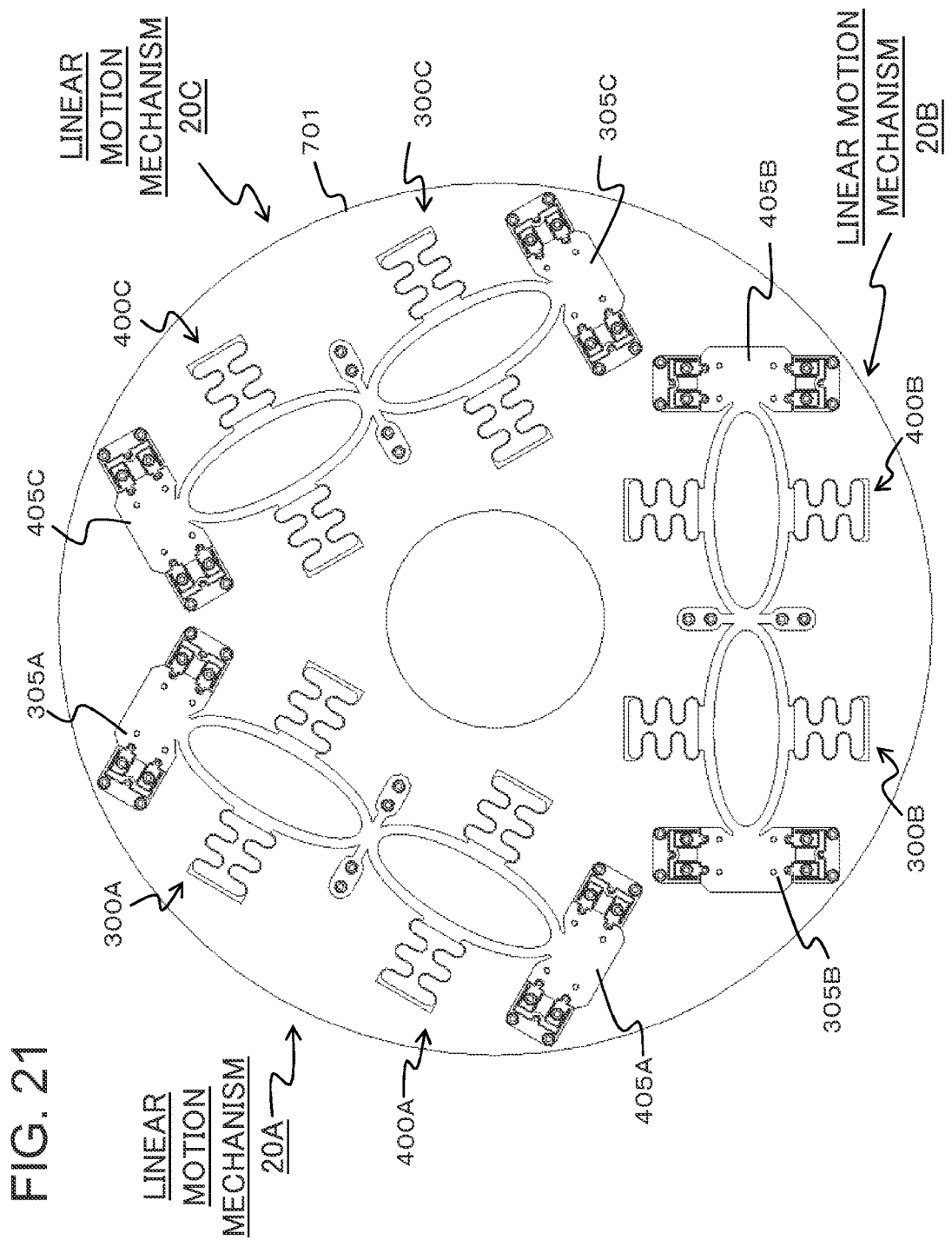

LINKAGE ROD INCLUDING LIMITED-DISPLACEMENT FLEXIBLE MECHANISM

BACKGROUND OF THE INVENTION

1. Field of the Invention

The present invention relates to a limited-displacement flexible mechanism which can be used in a linkage rod or a support arrangement.

2. Description of the Related Art

With the increasing market demand for precision technology, a linear motion actuator providing high precision has become important for machinery requiring precise displacement such as multiple-degree-of-freedom displacement mechanism, micro-manipulator or the like. In most cases, such a linear motion actuator uses an electromechanical or electrohydraulic arrangement which is usually provided for each rod of a six-degree-of-freedom mechanism (so called Hexapod) (see Japanese Patent Unexamined Publication No. JP2013-096574, U.S. Pat. No. 8,978,480 B2). In the hexapod system, each of the six rods is adjustable to precisely position an object in three dimensional space.

A mounting assembly which can correct the position of a device to be supported along six degrees of freedom is disclosed in U.S. Pat. No. 6,402,329 B1. The mounting assembly has three mounting devices each having a deformable triangle structure composed of two sides and a variable length arm. Each of the sides includes a friction free hinge comprising a pair of flexible strips which are located in two planes orthogonal to each other.

SUMMARY OF THE INVENTION

However, in the case of a supporting rod with high rigidity and strength so as to achieve precise positioning, it is necessary to use a plurality of parts to assemble the machinery, resulting in difficulty in miniaturization and weight reduction. On the other hand, if in the case where the flexible strips are employed for a linkage rod as the above-mentioned mounting assembly, it is difficult to prevent the machinery from breakage under heavy load or severe environments. Accordingly, the existing techniques cannot achieve a light-weight, miniaturized and simply-manufactured hexapod with high precision.

An object of the present invention is to provide a linkage rod including a novel limited-displacement flexible mechanism which can achieve structural robustness and allows easy reduction in weight and size, and simple production.

According to the present invention, a linkage rod including a limited-displacement flexible mechanism, wherein the limited-displacement flexible mechanism comprises at least one limited-displacement flexible joint which comprises: a flexible member shaped like a plate; and at least one bend limitation section which is arranged in parallel with the flexible member so that the bend limitation section limits a bend of the flexible member.

According to the present invention, a bipod comprising two linkage rods each including a limited-displacement flexible mechanism, wherein the limited-displacement flexible mechanism comprises at least one limited-displacement flexible joint which comprises: a flexible member shaped like a plate; and at least one bend limitation section which is arranged in parallel with the flexible member so that the bend limitation section limits a bend of the flexible member.

BRIEF DESCRIPTION OF THE DRAWINGS

FIG. 4 is a schematic diagram showing an example of the production process of a linear motion mechanism as shown in FIG. 1.

FIG. 21 is a plan view illustrating the hexapod mechanism as shown in FIG. 17 in a state such that both a mounting base and all bipods have been removed.

DETAILED DESCRIPTION OF THE EMBODIMENTS

A limited-displacement flexible mechanism employed in a linkage rod comprises at least one limited-displacement flexible joint which is composed of: a flexible blade; and at least one bend limitation section which is arranged in parallel with the flexible blade. The bend limitation section may include two parts which are engaged with each other such that one part is rotatable with respect to the other part within a limited range of angle in a direction of bending the flexible blade.

More specifically, a first part of the bend limitation section has a protrusion provided with a pair of stoppers protruding outside from the first part. A second part of the bend limitation section has a recess which is rotatably engaged with the protrusion of the first part. The rotation of the first part is limited by one of the stoppers making contact with one top edge of the recess depending on a bend of the flexible blade. Preferably, the protrusion of the first part is cylindrically shaped so as to rotate depending on a bending direction of the flexible blade.

More preferably, the linkage rod is provided with at least one pair of limited-displacement flexible joints such that each pair of limited-displacement flexible joints is allowed to bend in both directions orthogonal to each other, respectively. Further preferably, the linkage rod is formed integrally by using any technology including injection molding, 3-dimentional printer or MEMS (Micro Electro Mechanical Systems).

A bipod having two linkage rods as described above can be used to assemble a multiple-degree-of-freedom adjustment mechanism which includes a base plate, a top plate and a plurality of support assemblies, each of support assemblies including the bipod and a linear motion mechanism. The bipod has the two linkage rods, one ends of which are fixed to each other at a top provided with a support section. The support section moves within a predetermined range on a plane formed by the linkage rods depending on respective linear motions of the linear motion mechanism.

1. First Example of Linear Motion Mechanism

Figure 1:
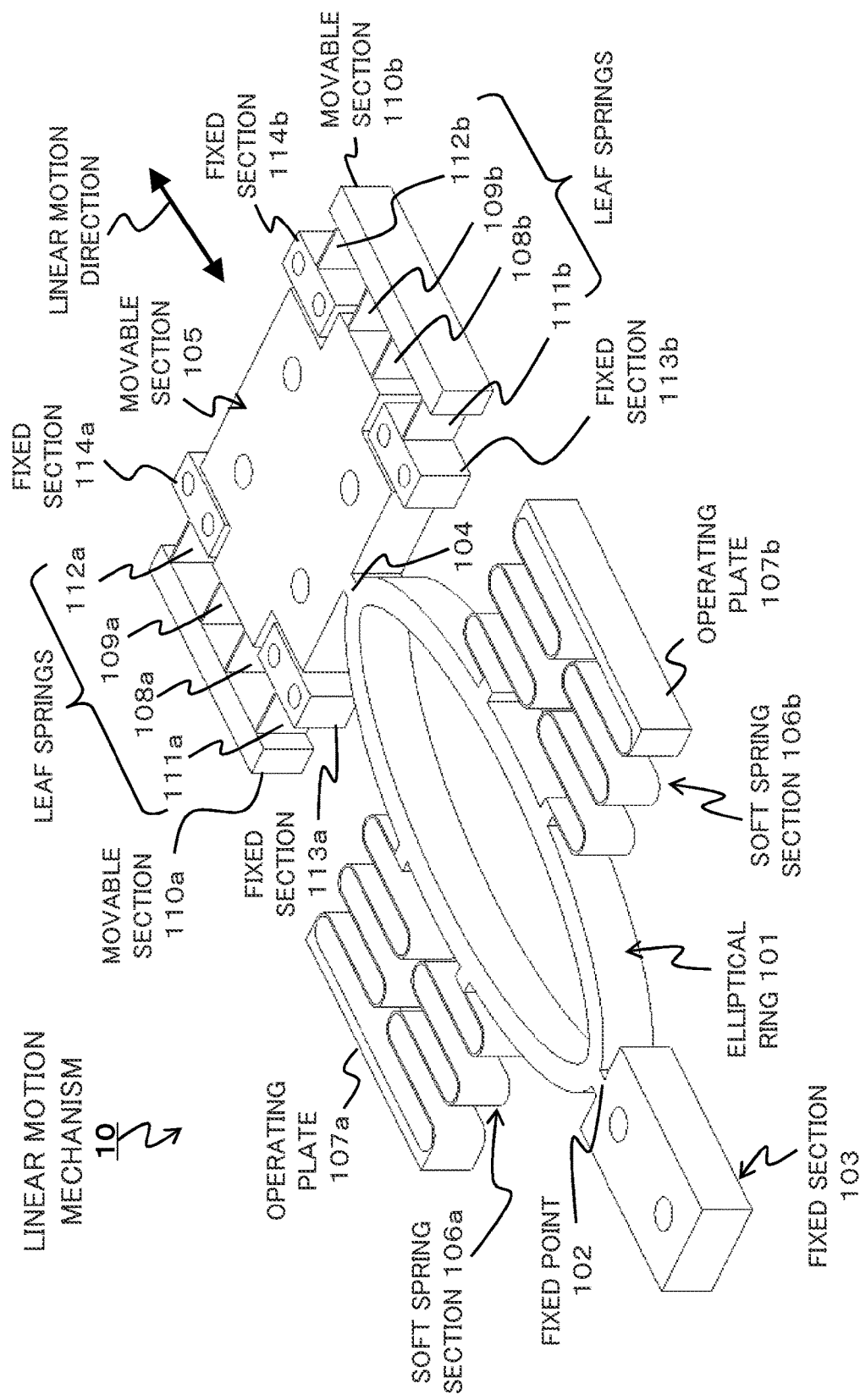
FIG. 1 is a perspective view illustrating a first example of a linear motion mechanism used in a support assembly to which a limited-displacement flexible mechanism according to an exemplary embodiment of the present invention is applied.
Figure 2:
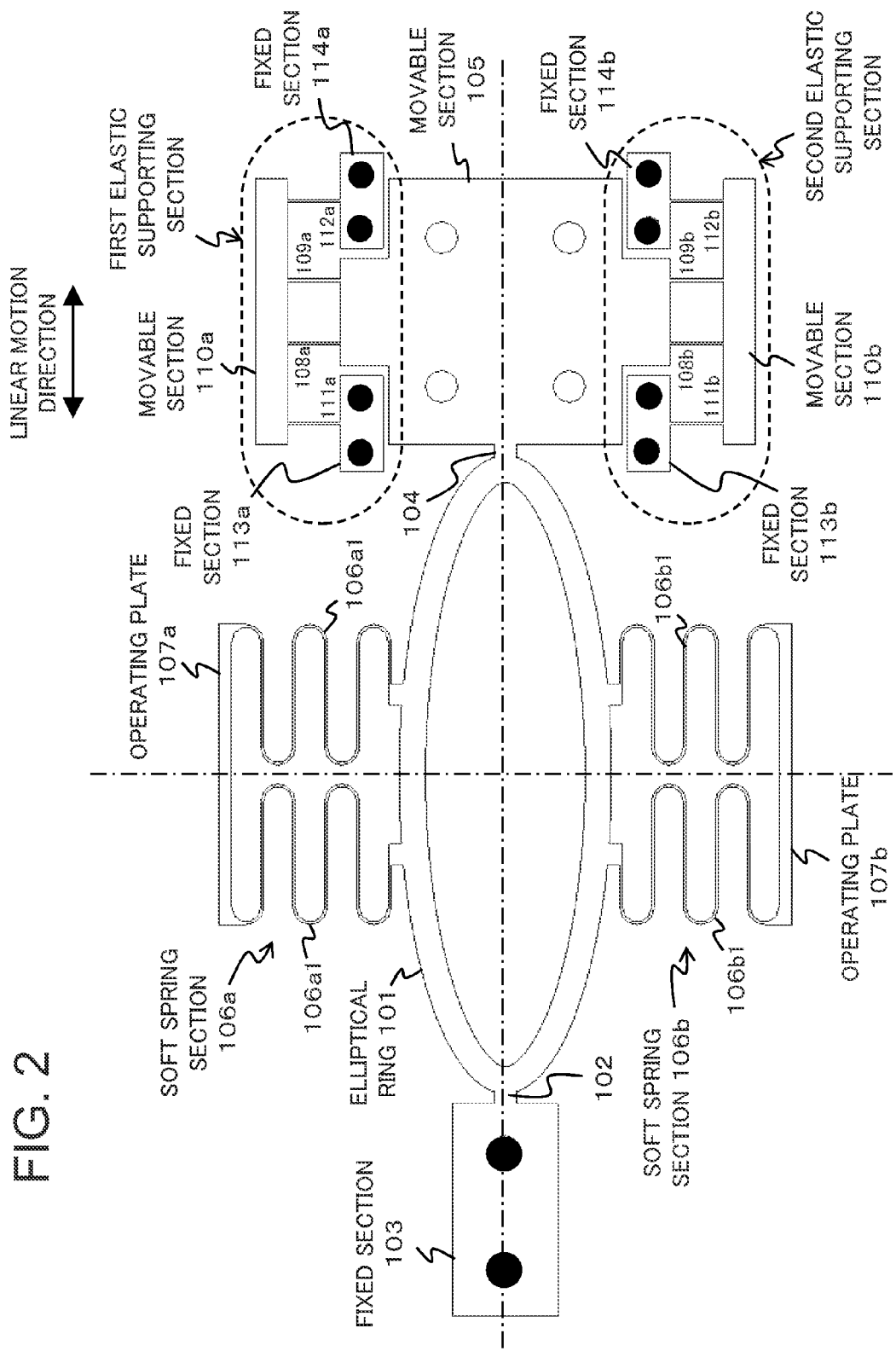
FIG. 2 is a plan view illustrating the linear motion mechanism shown in FIG. 1.

Referring to FIGS. 1 and 2, a linear motion mechanism 10 used in a multiple-degree-of-freedom adjustment mechanism employing at least one bipod includes an elliptical ring 101 having a fixed point 102 connected to a fixed section 103 and a movable point 104 connected to a movable section 105. The fixed point 102 and the movable point 104 are both ends of the major axis of the elliptical ring 101.

The elliptical ring 101 has soft spring sections 106a and 106b which are fixed respectively to both sides of the elliptical ring 101 in the direction of the minor axis so that the elliptical ring 101 is sandwiched between the soft spring sections 106a and 106b. The respective ends of the soft spring sections 106a and 106b are provided with operating plates 107a and 107b. Preferably, the soft spring sections 106a and 106b have the same spring constant so as to press or stretch the elliptical ring 101 equally. In FIG. 1, the soft spring sections 106a and 106b are a bellows-like spring, which is merely an example.

Each of the soft spring sections 106a and 106b is preferably composed of two soft springs which are arranged in parallel with each other. More specifically, as shown in FIG. 2, the soft spring section 106a is composed of two soft springs 106a1 and 106a2, which are arranged in parallel and may be symmetric with respect to the minor axis of the elliptical ring 101. The soft spring section 106b is composed of two soft springs 106b1 and 106b2 in the same arrangement as the soft spring section 106a. This two-parallel-spring arrangement enables a self-alignment function with eliminating the effects of misalignment, allowing the movable section 105 to linearly move as intended without the need of pressing or stretching the operating plates 107a and 107b perpendicularly to their respective surfaces.

The movable section 105 is supported on both sides thereof by first and second elastic supporting sections to ensure linear motion along the major axis of the elliptical ring 101. One side of the movable section 105 is connected to a first elastic supporting section. More specifically, the movable section 105 is connected to a movable section 110a through two leaf springs 108a and 109a. The movable section 110a is further connected to fixed sections 113a and 114a through leaf springs 111a and 112a, respectively. In other words, the one side of the movable section 105 is connected to the fixed sections 113a and 114a through a first pair of leaf springs 108a and 109a and a second pair of leaf springs 111a and 112a. Similarly the other side of the movable section 105 is connected to the second elastic supporting section such that the movable section 105 is connected to the fixed sections 113b and 114b through a first pair of leaf springs 108b and 109b, a movable section 110b and a second pair of leaf springs 111b and 112b.

In this manner, both sides of the movable section 105 are supported by the first and second elastic supporting sections, respectively so that the movable section 105 stably move along the major axis of the elliptical ring 101 without swinging.

In addition, two corners on the one side of the movable section 105 are cut away so that the fixed sections 113a and 114a are partly placed within the cutaway portions, respectively. Similarly, two corners on the other side of the movable section 105 are cut away so that the fixed sections 113b and 114b are partly placed within the cutaway portions, respectively. Accordingly, the movable section 105 is movably sandwiched between the fixed sections 113a and 113b and between the fixed sections 114a and 114b, preventing the motion of the movable section 105 from excessive swinging from side to side and its excessive displacement in the direction of the major axis of the elliptical ring 101 and therefore restricting the motion of the movable section 105 within a predetermined range.

As described already, the spring constants of a pair of the soft spring sections 106a and 106b and two pairs of the leaf springs 108a and 109a and the leaf springs 111a and 112a can be selected appropriately to obtain a desired speed reduction ratio. An operation of the linear motion mechanism 10 will be described.

Figure 3:
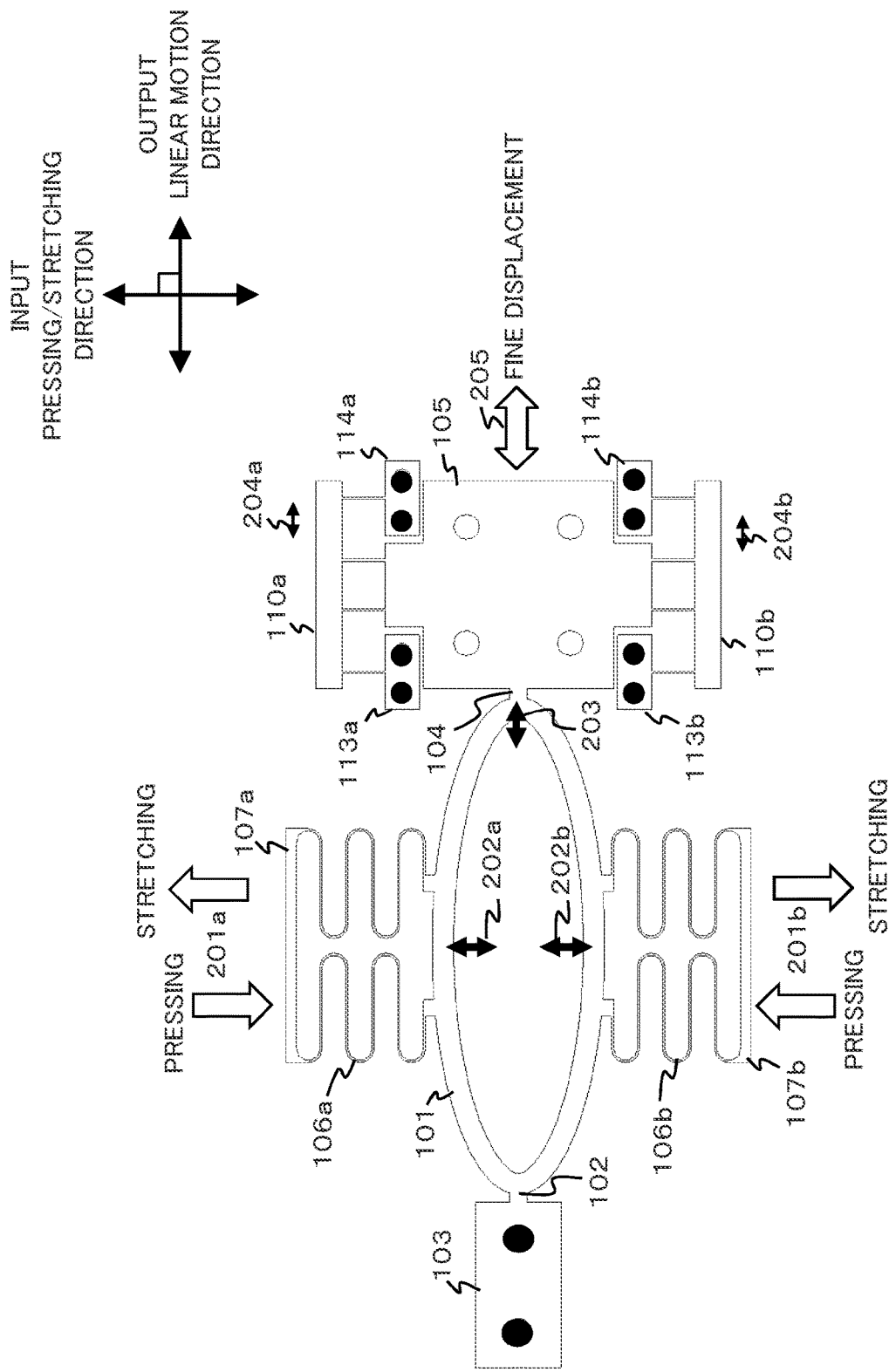
FIG. 3 is a diagram showing an operation of the linear motion mechanism shown in FIG. 1.

Referring to FIG. 3, when the soft spring sections 106a and 106b are pressed or stretched in mutually opposite input directions 201a and 201b, the elliptical ring 101 is deformed as shown by arrows 202a, 202b and 203 such that the length of the minor axis is reduced or increased and the length of the major axis is increased or reduced. Since the fixed point 102 is prevented from moving, the movable point 104 moves in the direction 203, causing the movable section 105 to slightly move in the output direction 205 while the movable sections 110a and 110b also slightly moving in the same directions 204a and 204b, respectively.

In this manner, by the soft springs 106a and 106b pressing or stretching the elliptical ring 101, the elliptical ring 101 is elastically deformed to linearly move the movable section 105 along the major axis of the elliptical ring 101. The input direction of the pressing/stretching is orthogonal to the output direction of linear motion of the movable section 105. In the case where the spring constant of the soft spring sections 106a and 106b is lower than the spring constants of the elliptical ring 101 and the leaf springs 108a, 109a, 111a, 112a, 108b, 109b, 111b and 112b, the amount of input displacement applied to the soft spring sections 106a and 106b can be transformed to a desired amount of linear motion of the movable section 105.

As described above, the linear motion mechanism 10 is allowed to operate on the same flat surface, resulting in enhanced miniaturization and structural strength as well as easy operation.

As illustrated in FIG. 4, all sections 101-114 of the linear motion mechanism 10 may be formed integrally by cutting its plane structural shape from a single elastic plate 120 with a homogeneous material having a predetermined thickness. Accordingly, the linear motion mechanism 10 has a two-dimensional structure with all sections 101-114 having the same thickness, allowing easy reduction in weight and size and simple production. Another technology such as injection molding, 3-dimentional printer or MEMS (Micro Electro Mechanical Systems) may be employed for production of the linear motion mechanism 10.

According to the above-mentioned linear motion mechanism used in the multiple-degree-of-freedom adjustment mechanism, larger input displacement of the soft spring sections is transformed to smaller linear motion of the movable section according to a spring constant ratio. Accordingly, even whether the input displacement is applied to the soft spring sections with less precision, the linear motion mechanism can provide linear motion with greater precision. If the spring constant ratio is previously known, the amount of displacement of the movable section can be calculated with precision by precisely measuring the input displacement of the soft springs without precisely measuring the displacement of the movable section. Accordingly, the first exemplary embodiment of the present invention can achieve nano-resolution motion of the movable section.

In addition, as described above, each section of the linear motion mechanism 10 moves due to the Nature of Motion through the monocoque design with homogenous materials and without any passages via sliding mechanisms, resulting in no potential motion losses and achieving the followings:
i. Absolutely predictable and repeatable motions;
ii. Precise motion without complex position sensors and close-loop servo control, therefore enabling an open-loop control;
iii. Perfectly working in a wide temperature ranges, cryogenic to the upper 400° C. or even more;
iv. Semi-permanent life without the need of considerations of the pressing/stretching mechanisms (input mechanisms);
v. Zero particle and zero cross contamination; and
vi. High resistance to corrosive conditions such as being submerged in the corrosive gases and liquid.

2. Second Example of Linear Motion Mechanism

Figure 5:
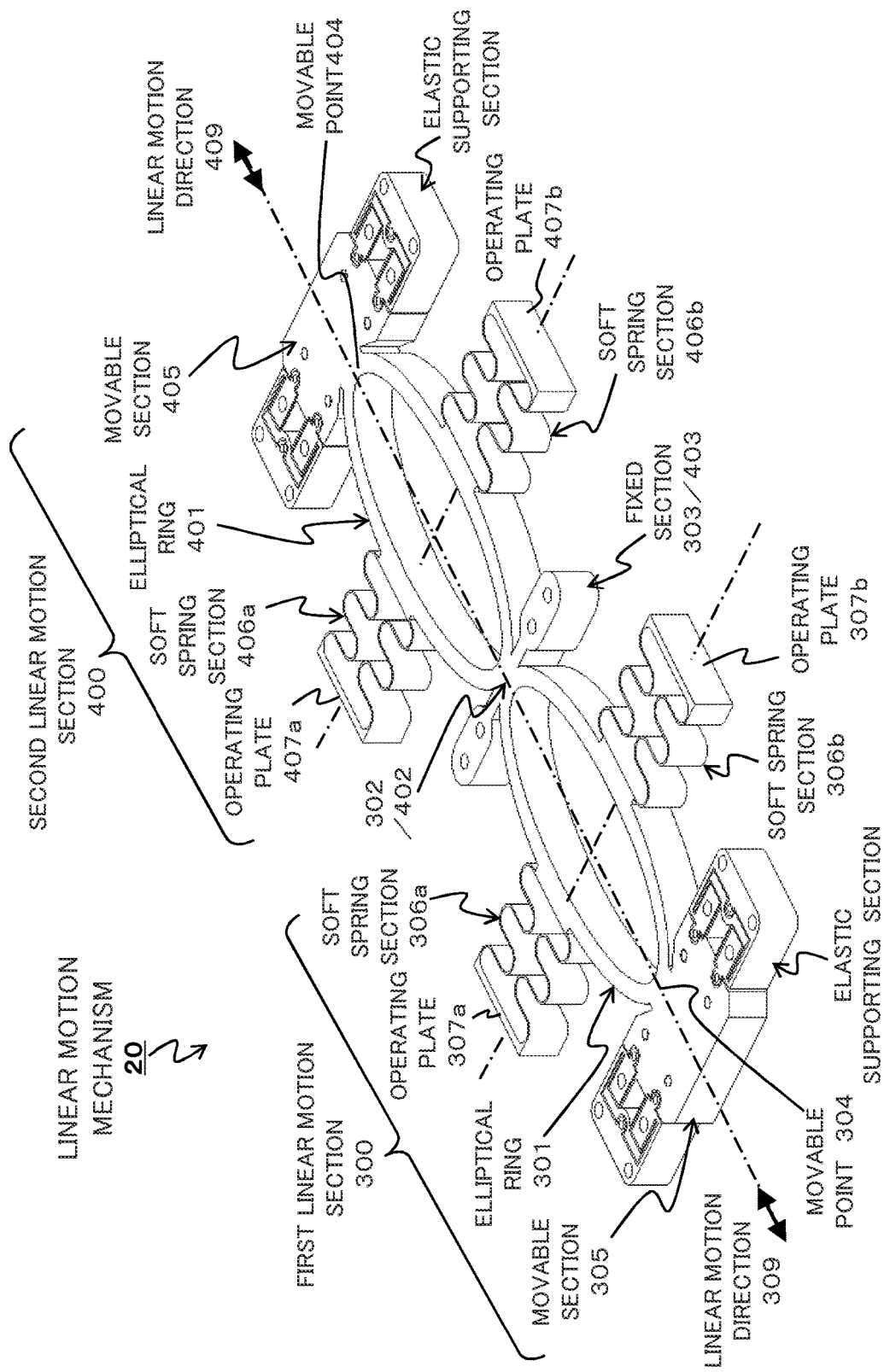
FIG. 5 is a perspective view illustrating a second example of a linear motion mechanism used in a support assembly to which a limited-displacement flexible mechanism according to an exemplary embodiment of the present invention is applied.
Figure 6:
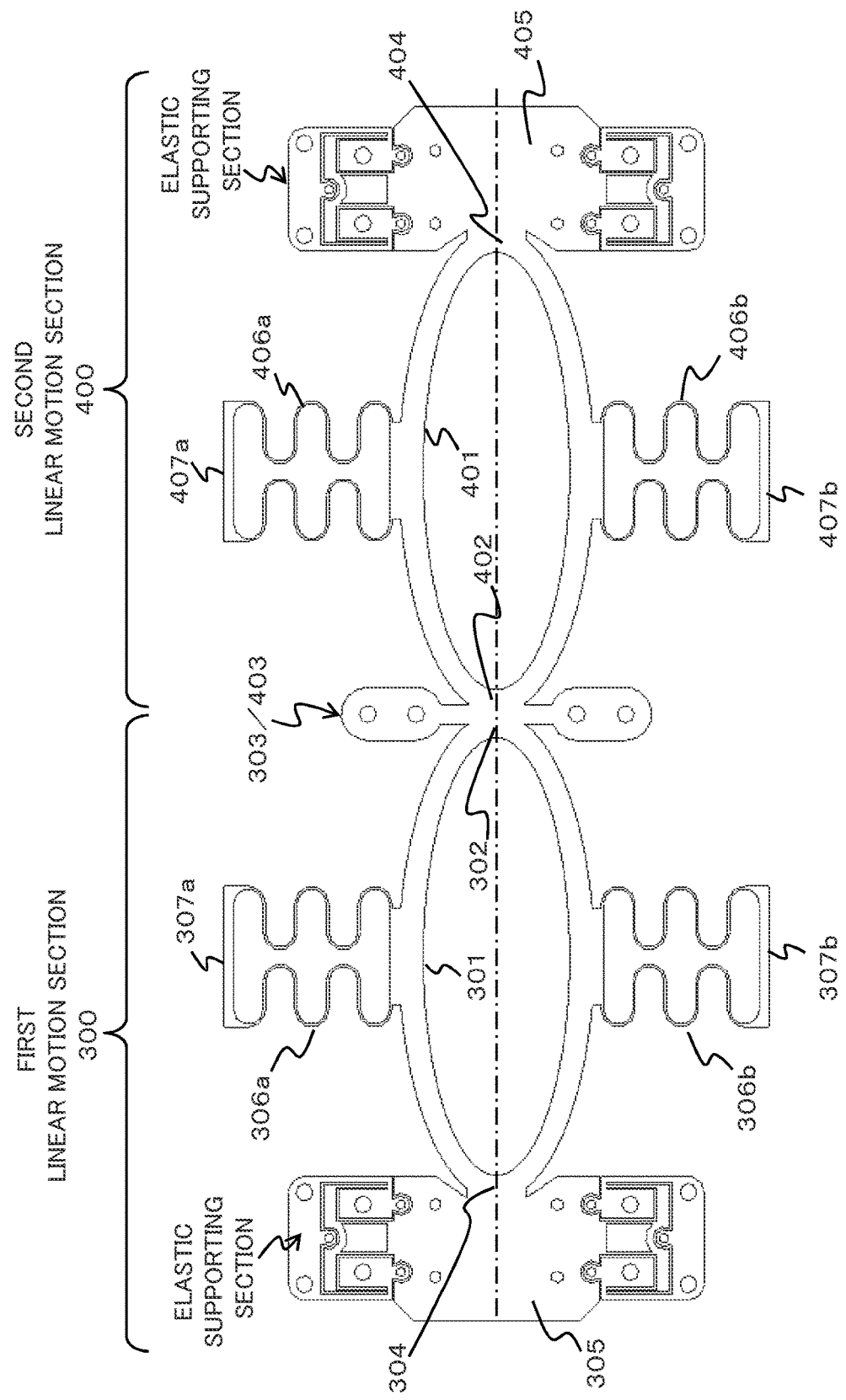
FIG. 6 is a plan view illustrating the linear motion mechanism shown in FIG. 5.

As shown in FIGS. 5 and 6, a linear motion mechanism 20 used in a multiple-degree-of-freedom adjustment mechanism employing at least one bipod is formed by a combination of first linear motion section 300 and second linear motion section 400, each of which has the substantially same functional structure as the linear motion mechanism 10 as shown in FIGS. 1 and 2. The first linear motion section 300 and the second linear motion section 400 are arranged such that the major axes of the elliptical rings 301 and 401 are in alignment with each other. The first linear motion section 300 and the second linear motion section 400 have a common fixed section 303/403 corresponding to the fixed section 103 of the first exemplary embodiment. Accordingly, the linear motion mechanism 20 provides movable sections 305 and 405 respectively on its both sides.

More specifically, the first linear motion section 300 includes an elliptical ring 301 having a fixed point 302 connected to a fixed section 303 and a movable point 304 connected to a movable section 305. The fixed point 302 and the movable point 304 are both ends of the major axis of the elliptical ring 301.

The elliptical ring 301 has soft spring sections 306a and 306b which are connected on both sides of the elliptical ring 301 in the direction of the minor axis, respectively. The respective ends of the soft spring sections 306a and 306b are provided with operating plates 307a and 307b. Preferably, the soft spring sections 306a and 306b have the same spring constant so as to press or stretch the elliptical ring 301 equally. In FIG. 5, the soft spring sections 306a and 306b are a bellows-like spring, which is merely an example. Each of the soft spring sections 306a and 306b has the two-parallel-spring arrangement similar to the soft spring sections 106a and 106b of the first exemplary embodiment.

The movable section 305 is supported on both sides thereof by elastic supporting section to ensure linear motion along the major axis of the elliptical ring 301. The elastic supporting section is similar to the first and second elastic supporting sections of the first exemplary embodiment and therefore the detailed descriptions are omitted. Since the respective sides of the movable section 105 are supported by the elastic supporting section, the movable section 305 stably move along the major axis of the elliptical ring 301 without swinging.

As described already, the spring constants of a pair of the soft spring sections 306a and 306b and the elastic supporting section can be selected appropriately to obtain a desired speed reduction ratio.

The structure of the second linear motion section 400 is similar to that of the first linear motion section 300. In brief, the second linear motion section 400 includes an elliptical ring 401 having a fixed point 402 connected to a fixed section 403 and a movable point 404 connected to a movable section 405. The fixed point 402 and the movable point 404 are both ends of the major axis of the elliptical ring 401. The elliptical ring 401 has soft spring sections 406a and 406b which are connected on both sides of the elliptical ring 401 in the direction of the minor axis, respectively. The respective ends of the soft spring sections 406a and 406b are provided with operating plates 407a and 407b. The movable section 405 is supported on both sides thereof by elastic supporting section to ensure linear motion along the major axis of the elliptical ring 401.

Figure 7:
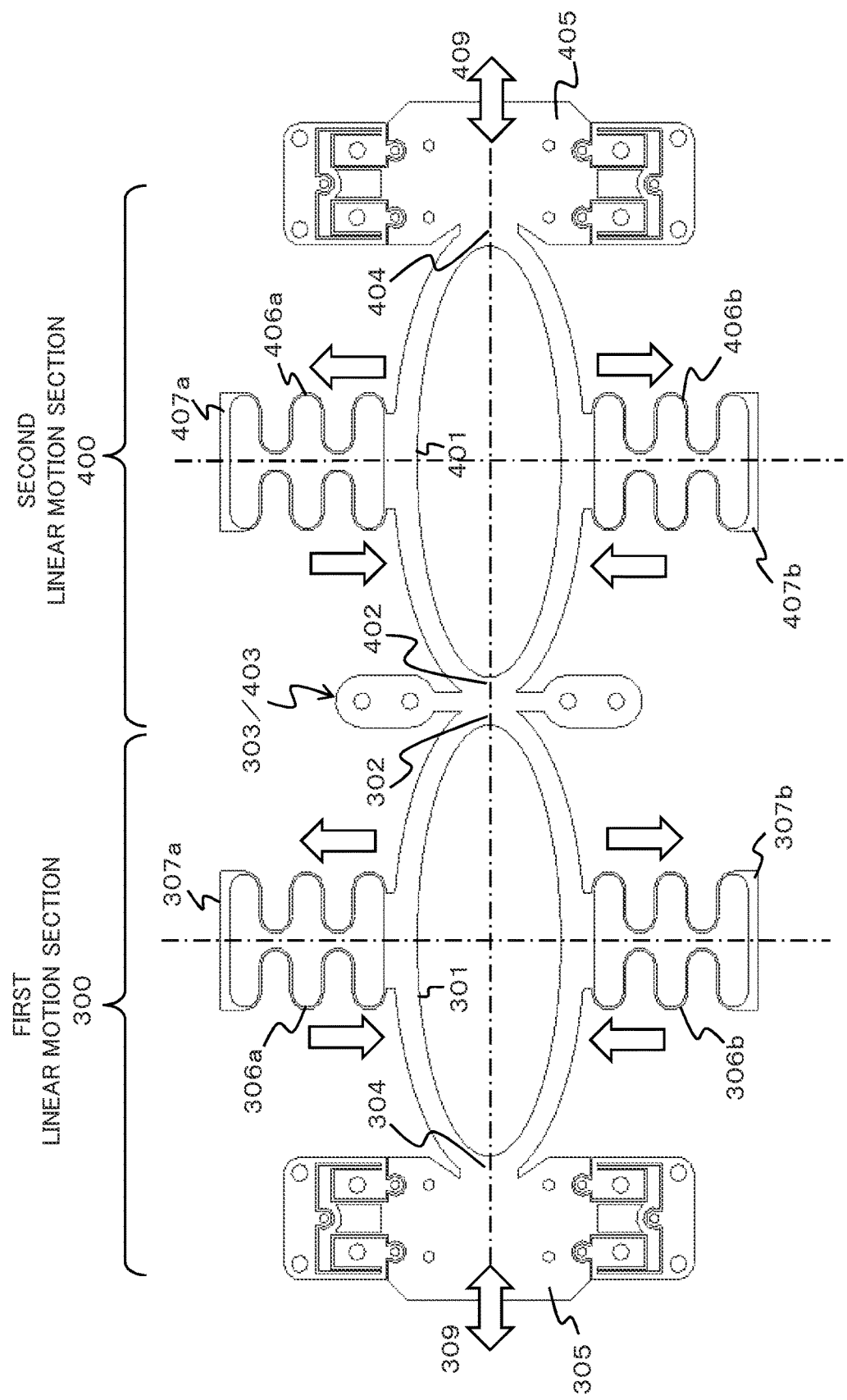
FIG. 7 is a diagram showing an operation of the linear motion mechanism shown in FIG. 5.

As shown in FIG. 7, the operating plates 307a and 307b are operated in the opposite directions, causing the soft springs 306a and 306b concurrently to be pressed or stretched as mentioned in the first exemplary embodiment. Similarly, the operating plates 407a and 407b are operated in the same manner as, but independently of the operating plates 307a and 307b. Accordingly, when the soft spring sections 306a and 306b and the soft spring sections 406a and 406b are pressed or stretched, the elliptical rings 301 and 401 are deformed to move the movable sections 305 and 405 in the directions 309 and 409, respectively.

In this manner, by the operating plates 307a and 307b and the operating plates 407a and 407b elastically deforming the elliptical rings 301 and 401, respectively, the movable sections 305 and 405 are linearly moved along the major axis of the elliptical rings 301 and 401.

The direction of pressing/stretching the soft spring sections is orthogonal to the direction of linear motion of the movable sections 305 and 405. In the case where the spring constant of the soft spring sections 306a, 306b, 406a and 406b is lower than the spring constants of the elliptical rings 301 and 401 and the elastic supporting sections, the amount of input displacement applied to the soft springs 306a, 306b, 406a and 406b can be transformed to a desired amount of linear motion of the movable sections 305 and 405. Accordingly, the linear motion mechanism 20 can provide the advantageous effects similar to the first exemplary embodiment.

Similarly to the first example as shown in FIG. 4, all sections of the linear motion mechanism 20 may be also formed integrally, for example, by cutting its plane structural shape from a single elastic plate having a predetermined thickness. Accordingly, it is possible to produce the linear motion mechanism 20 having a two-dimensional structure with all sections having the same thickness, allowing easy reduction in weight and size and simple production. Another technology such as injection molding, 3-dimentional printer or MEMS (Micro Electro Mechanical Systems) may be employed for production of the linear motion mechanism 10.

3. First Exemplary Embodiment 3.1) Structure

Figure 8:
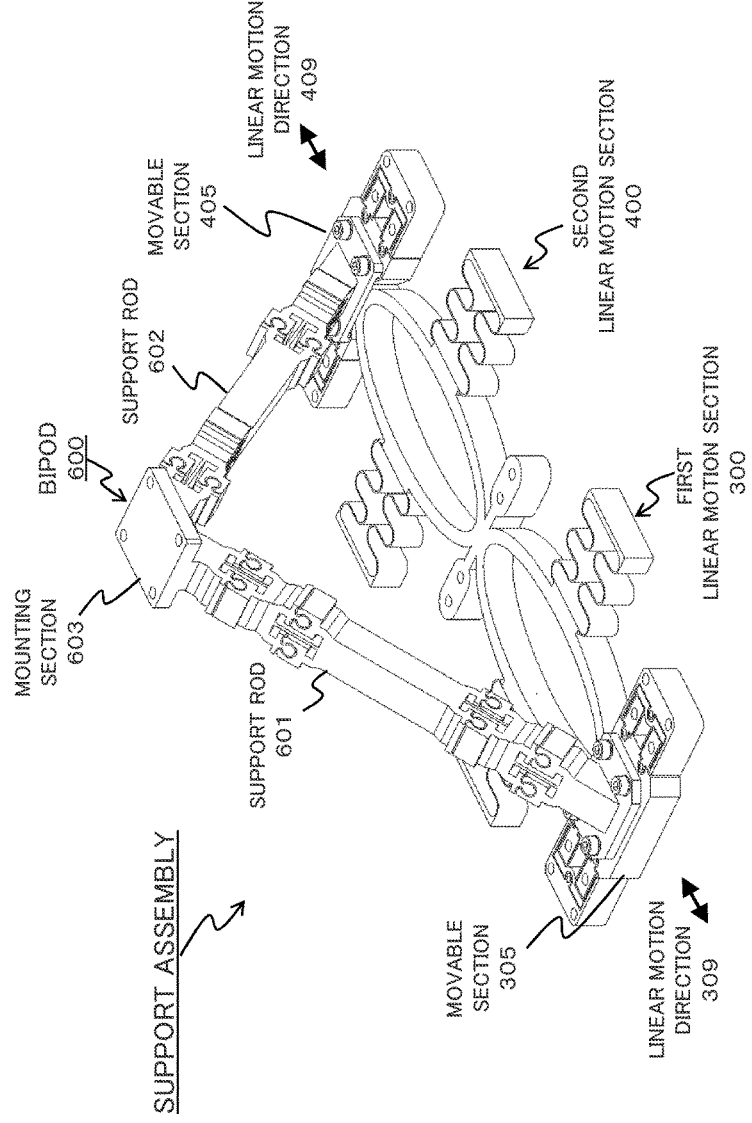
FIG. 8 is a perspective view illustrating a support assembly using a bipod including a limited-displacement flexible mechanism according to the first exemplary embodiment of the present invention.

Referring to FIG. 8, a support assembly using a bipod composed of two linkage rods according to a first exemplary embodiment of the present invention is composed of a bipod 600 and the linear motion mechanism 20 as described above. The bipod 600 has two support rods 601 and 602, one ends of which are connected at a top provided with a support section 603 to form an upside-down V-shaped bipod. The other ends of the support rods 601 and 602 are fixed to the movable section 305 of the first linear motion section 300 and the movable section 405 of the second linear motion section 400, respectively. The support rods 601 and 602 have the same structure. Hereinafter, the structure of the support rod 601 shown in FIGS. 9-11 will be described as an example.

3.2) Bipod

Figure 9:
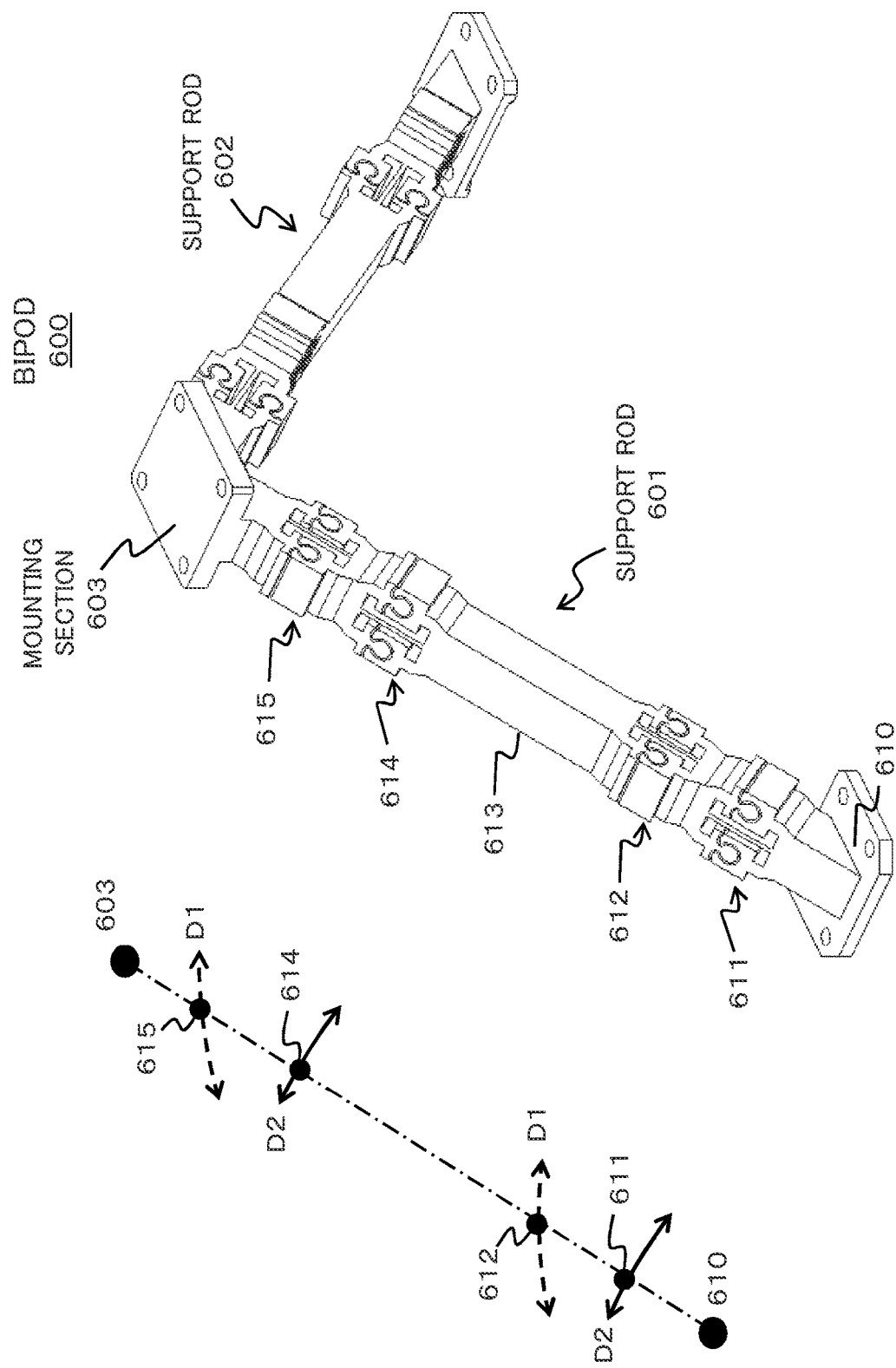
FIG. 9 is a perspective view of a bipod including the limited-displacement flexible mechanism as shown in FIG. 8.
Figure 10:
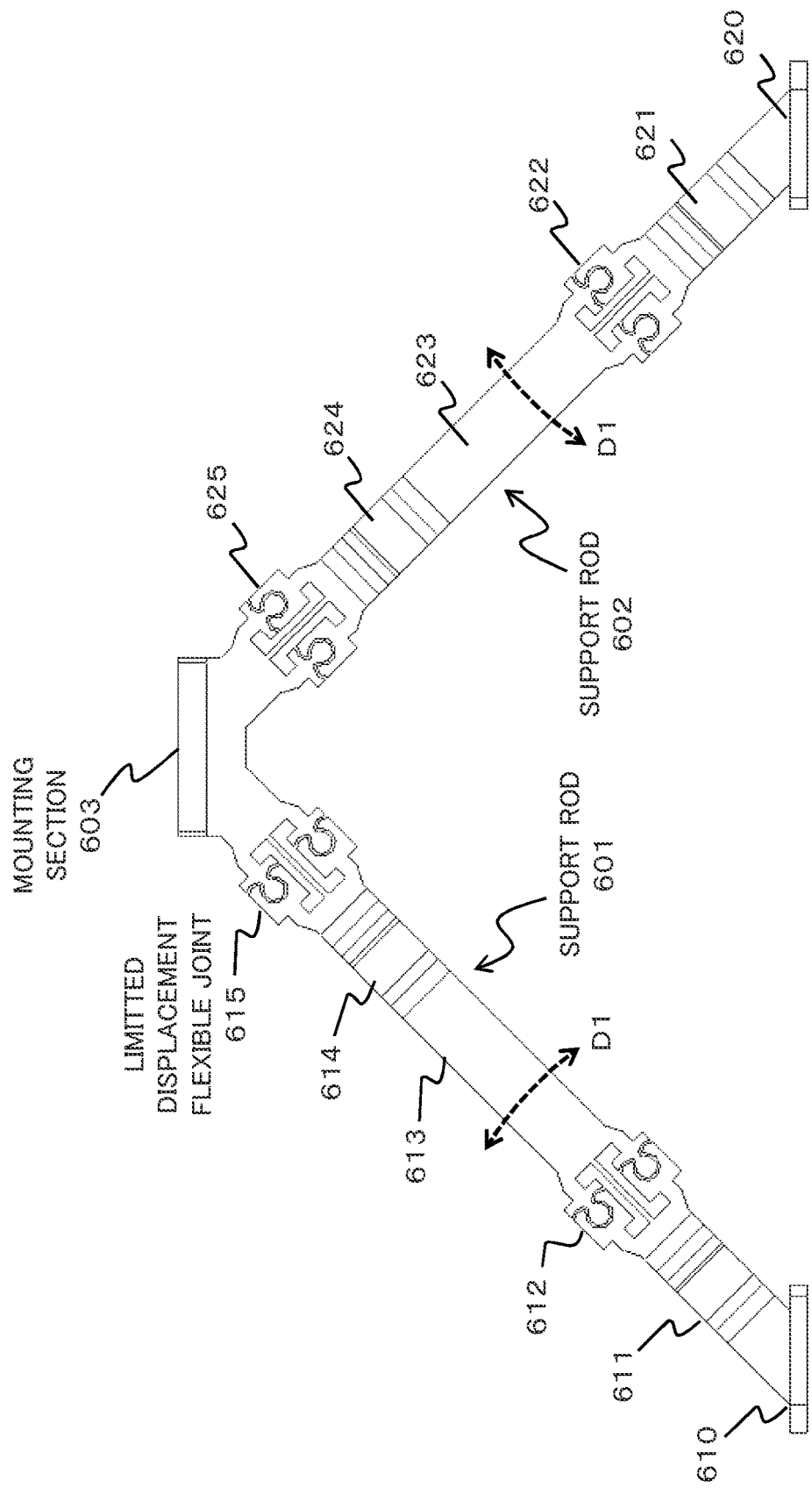
FIG. 10 is a side view of the bipod as shown in FIG. 9.
Figure 11:
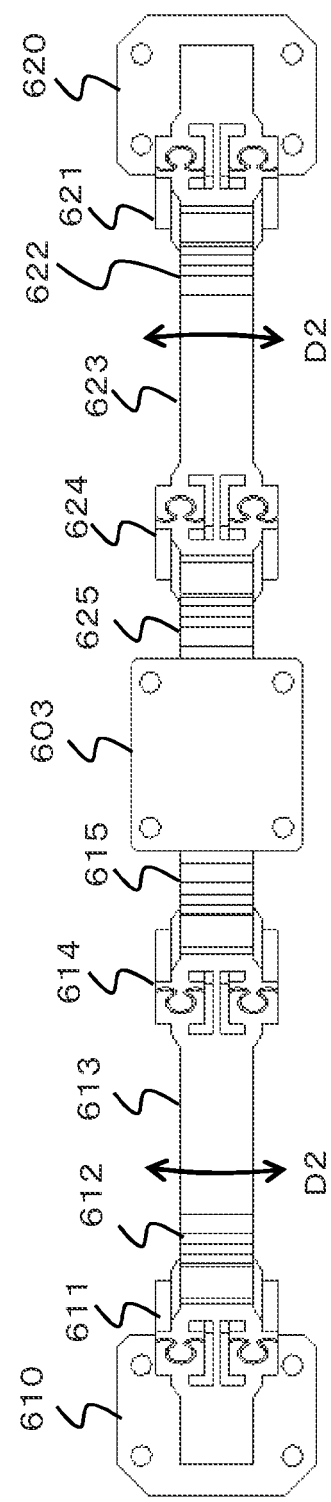
FIG. 11 is a plan view of the bipod as shown in FIG. 9.

Referring to FIGS. 9-11, the support rod 601 is shaped like a leg including a fixed portion 610, two limited-displacement flexible joints 611 and 612, a relatively rigid rod 613, and two limited-displacement flexible joints 614 and 615. Each of the limited-displacement flexible joints 611, 612, 614 and 615 provides limited flexibility in a direction alternating between orthogonal flexible directions D1 and D2 with respect to the longitudinal axis of the support rod 601. The flexible direction D1 is a direction orthogonal to the support rod 601 in a plane formed by the support rods 601 and 602, which is typically illustrated in FIG. 10. The flexible direction D2 is a direction orthogonal to the plane formed by the support rods 601 and 602, which is typically illustrated in FIG. 11. In the present example, the limited-displacement flexible joints 611 and 614 are allowed to curve in the direction D2 while the limited-displacement flexible joints 612 and 615 are allowed to curve in the direction D1. Accordingly, the support rod 601 can freely curve in the directions D1 and D2. Similarly, the support rod 602 is shaped like a leg including a fixed portion 620, two limited-displacement flexible joints 621 and 622, a relatively rigid rod 623, and two limited-displacement flexible joints 624 and 625 and can freely curve in orthogonal flexible directions D1 and D2 with respect to the longitudinal axis of the support rod 602.

However, each of the limited-displacement flexible joints 611, 612, 614, 615, 621, 622, 624 and 625 is designed to limit the degree of bending so as to prevent breakage of the joint. The detailed structure of a limited-displacement flexible joint will be described with references to FIGS. 12-14.

Figure 12:
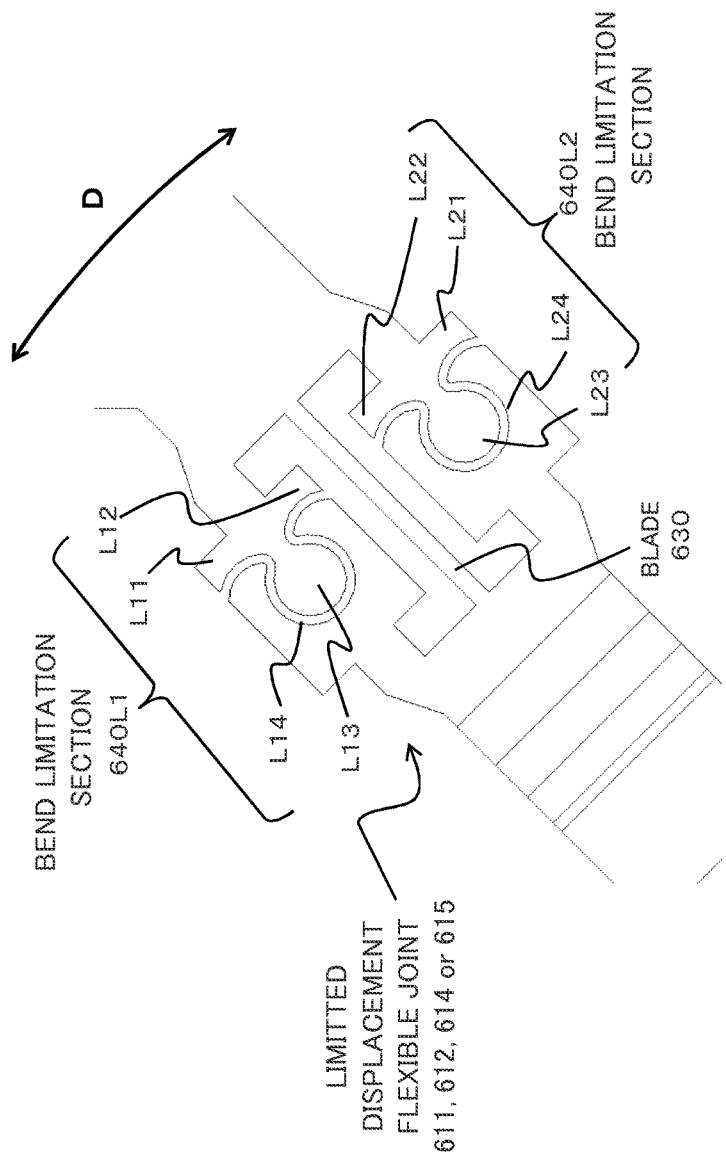
FIG. 12 is an enlarged side view of the limited-displacement flexible joint of the bipod as shown in FIG. 9.

Referring to FIG. 12, the limited-displacement flexible joint is composed of a flexible blade 630 which is a plate-shaped section with a relatively reduced thickness and a pair of bend limitation sections 640L1 and 640L2 which are provided on both sides of the flexible blade 630 in parallel to form a single joint. The flexible blade 630 provides flexibility as described above. Each of the bend limitation sections 640L1 and 640L2 is composed of two separate parts which are engaged with clearance to rotate around the axis vertical to the paper surface (as indicated by D). More specifically, one of the parts (an upper part) of the bend limitation sections 640L1 is composed of a pair of outer stopper L11 and inner stopper L12 protruding from the upper part and a cylindrically shaped protrusion L13 provided at the edge of the upper part. The other of the parts (a lower part) of the bend limitation sections 640L1 is composed of a cylindrically shaped recess L14 which is rotatably engaged with the cylindrically shaped protrusion L13. The bend limitation sections 640L2 has the same structure as the bend limitation sections 640L1. More specifically, one of the parts (an upper part) of the bend limitation sections 640L2 is composed of a pair of outer stopper L21 and inner stopper L22 protruding from the upper part and a cylindrically shaped protrusion L23 provided at the edge of the upper part. The other of the parts (a lower part) of the bend limitation sections 640L2 is composed of a cylindrically shaped recess L24 which is rotatably engaged with the cylindrically shaped protrusion L23.

Figure 13:
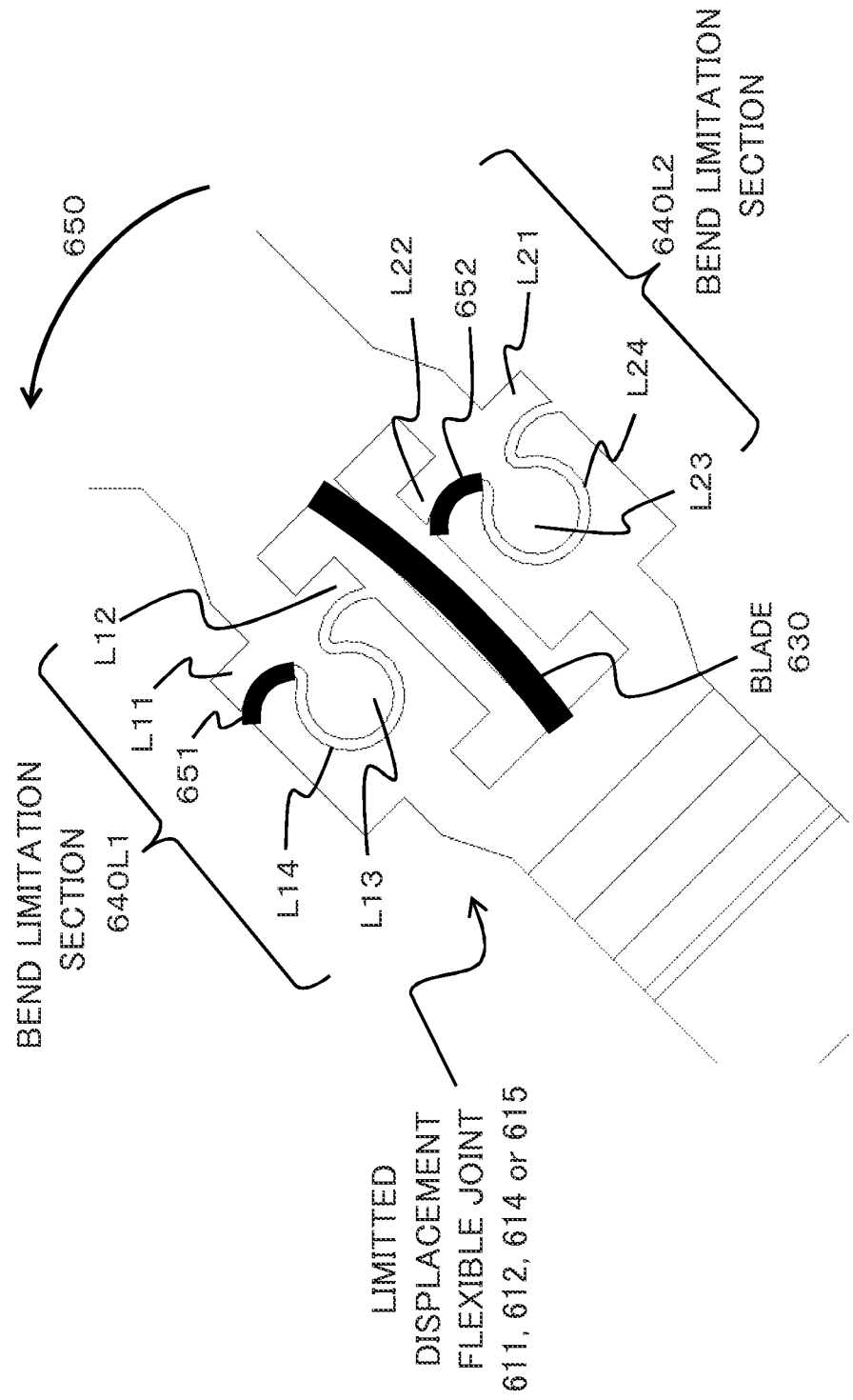
FIG. 13 is an enlarged side view of the limited-displacement flexible joint as shown in FIG. 12 in the case of being curved in one direction.

As shown in FIG. 13, when the support rod bends in the direction 650, the blade 630 also curve in the same direction 650, rotating the upper parts of the bend limitation sections 640L1 and 640L2 with respect to their lower parts, respectively. The respective rotations cause the stoppers L11 and L22 to be contacted on one top edges of the cylindrically shaped recesses L14 and L24 as indicated by reference numerals 651 and 652. Accordingly, the rotation of the upper part in the direction 650 is stopped tightly, preventing breakage of the blade 630.

Figure 14:
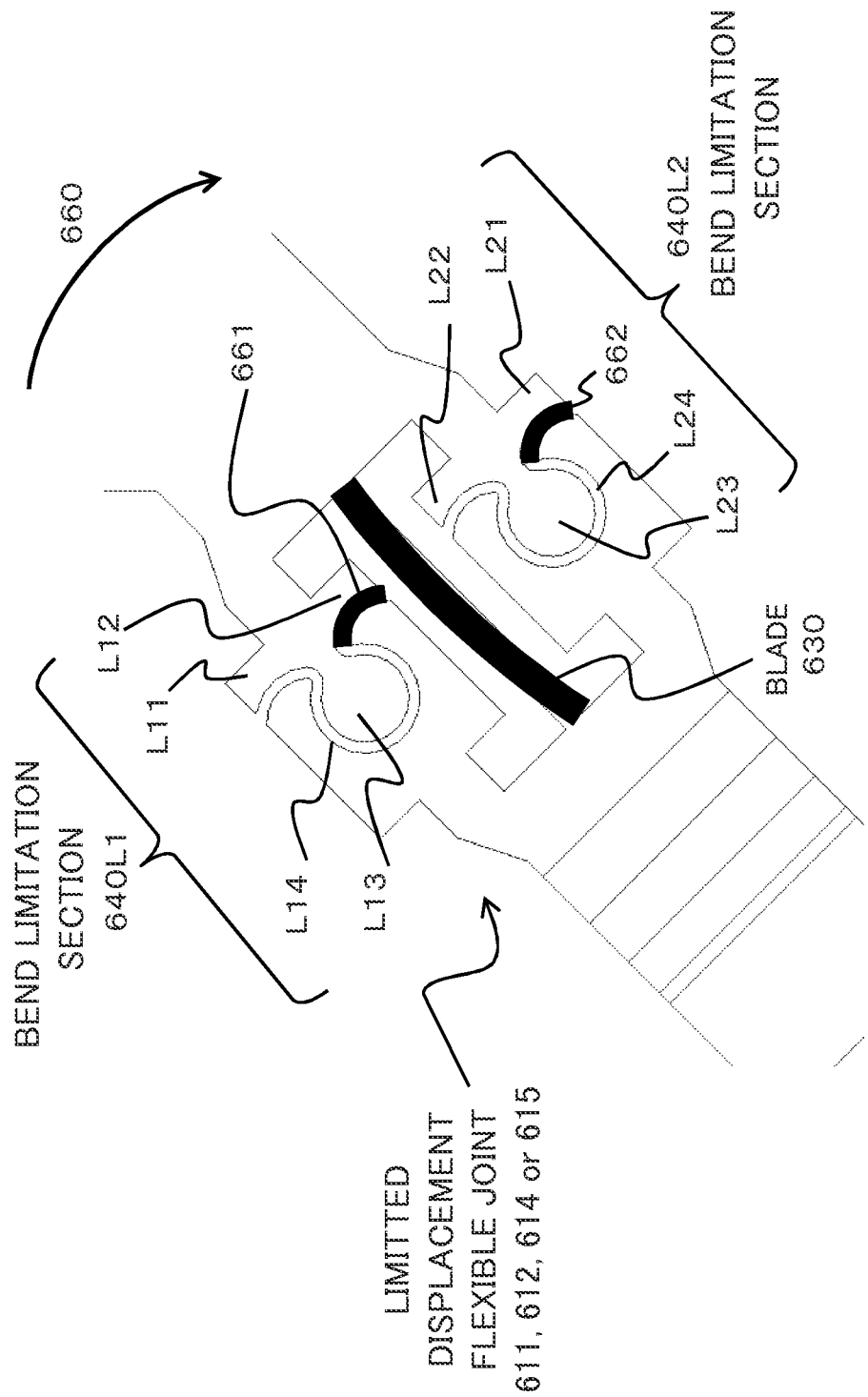
FIG. 14 is an enlarged side view of the limited-displacement flexible joint as shown in FIG. 12 in the case of being curved in the other direction.

As shown in FIG. 14, when the support rod bends in the opposite direction 660, the blade 630 also curve in the same direction 660, rotating the upper parts of the bend limitation sections 640L1 and 640L2 with respect to the lower parts, respectively. The respective rotations cause the stoppers L12 and L21 to be contacted on the other top edges of the cylindrically shaped recesses L14 and L24 as indicated by reference numerals 661 and 662. Accordingly, the rotation of the upper part in the direction 660 is also stopped tightly, preventing breakage of the blade 630.

3.3) Operation

Figure 15:
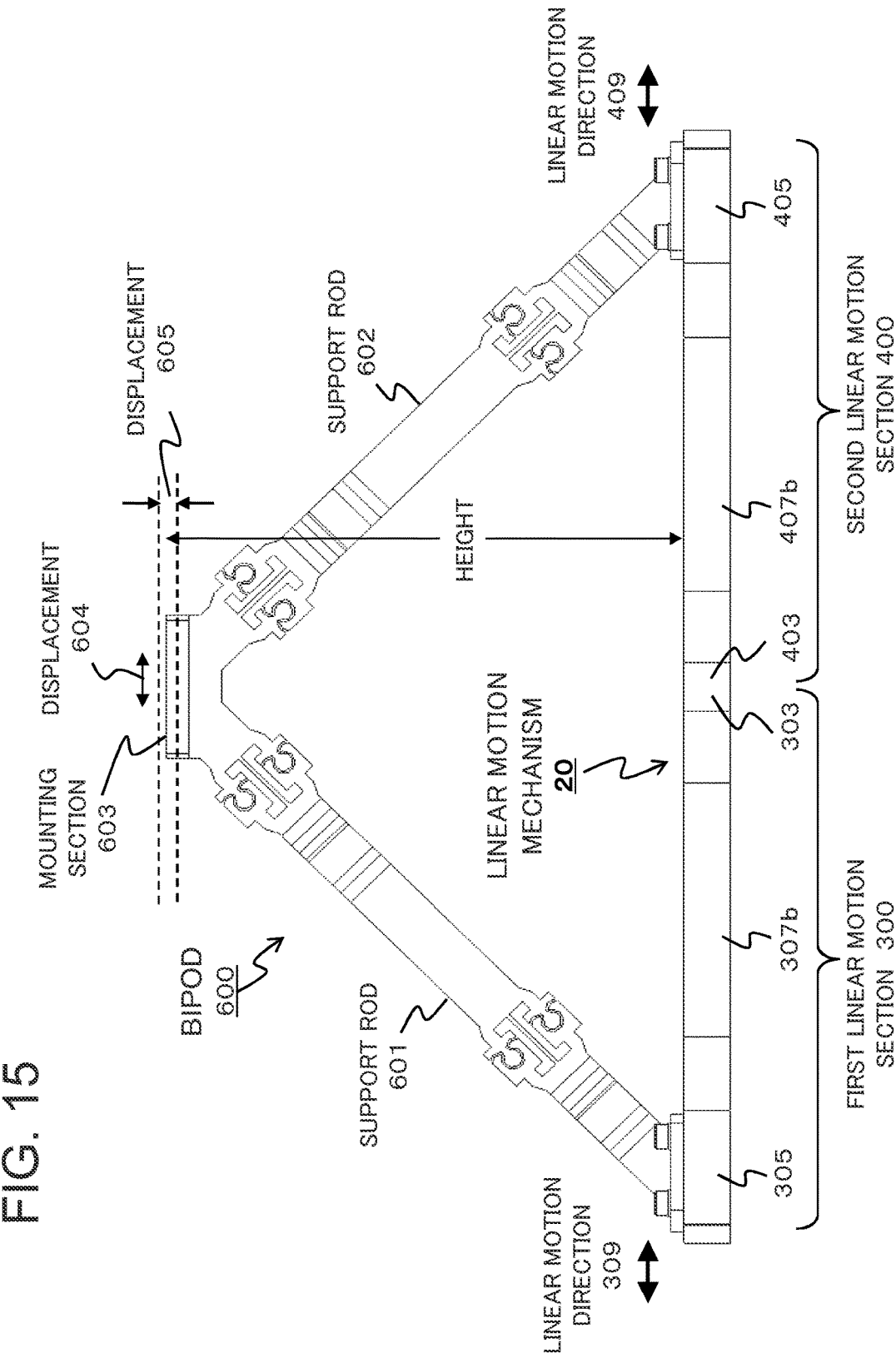
FIG. 15 is a side view of the support assembly using the limited-displacement flexible mechanism as shown in FIG. 8 f.

Referring to FIG. 15, the support assembly is assembled from the bipod 600 and the linear motion mechanism 20. The support rods 601 and 602 are fixed to the movable section 305 of the first linear motion section 300 and the movable section 405 of the second linear motion section 400, respectively. Accordingly, the support section 603 of the bipod 600 can be moved to an arbitrary position within a limited range on a plane formed by the support rods 601 and 602 depending on the respective directions and displacements of linear motion of the movable sections 305 and 405.

Figure 16A:
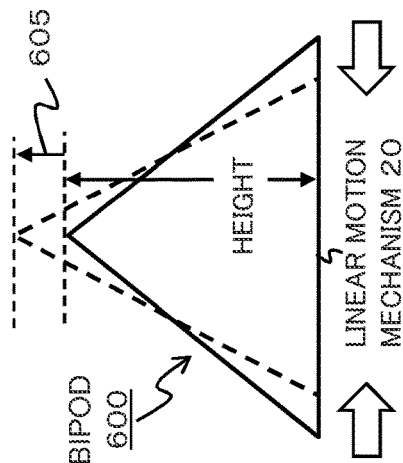
FIGS. 16A-16D are a schematic side-view structure of the support assembly as shown in FIG. 8 for explaining operations of the support assembly.

As shown in FIG. 16A, when the operating plates 307a and 307b and the operating plates 407a and 407b press the elliptical rings 301 and 401 respectively so that the linear motion mechanism 20 moves the movable sections 305 and 405 by the same displacement in the mutually opposite directions broadening the distance between the movable sections 305 and 405, the height of the bipod 600 with respect to the main surface of the linear motion mechanism 20 is reduced depending on the displacement of the movable sections 305 and 405 as indicated by displacement 605 perpendicular to the main surface of the linear motion mechanism 20.

Figure 16C:
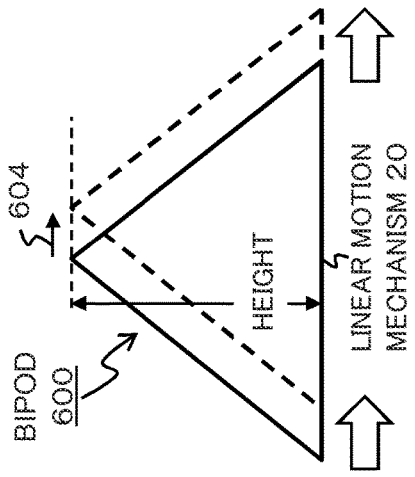
Figure 16B:
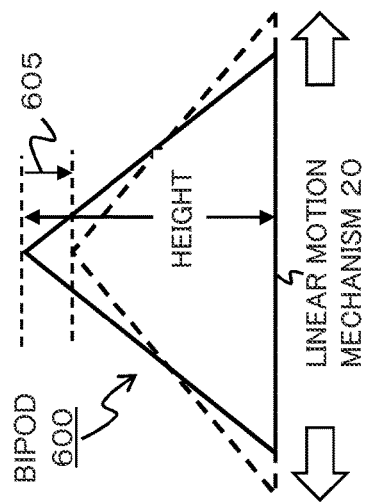

As shown in FIG. 16B, when the operating plates 307a and 307b and the operating plates 407a and 407b stretch the elliptical rings 301 and 401 respectively so that the linear motion mechanism 20 moves the movable sections 305 and 405 by the same displacement in the mutually opposite directions reducing the distance between the movable sections 305 and 405, the height of the bipod 600 with respect to the main surface of the linear motion mechanism 20 is increased depending on the displacement of the movable sections 305 and 405 as indicated by displacement 605 perpendicular to the surface of the linear motion mechanism 20.

Figure 16D:
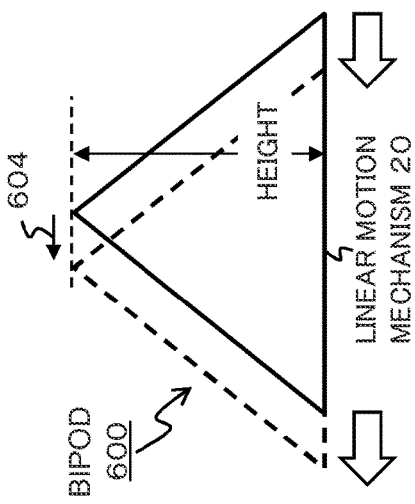
Figure 17:
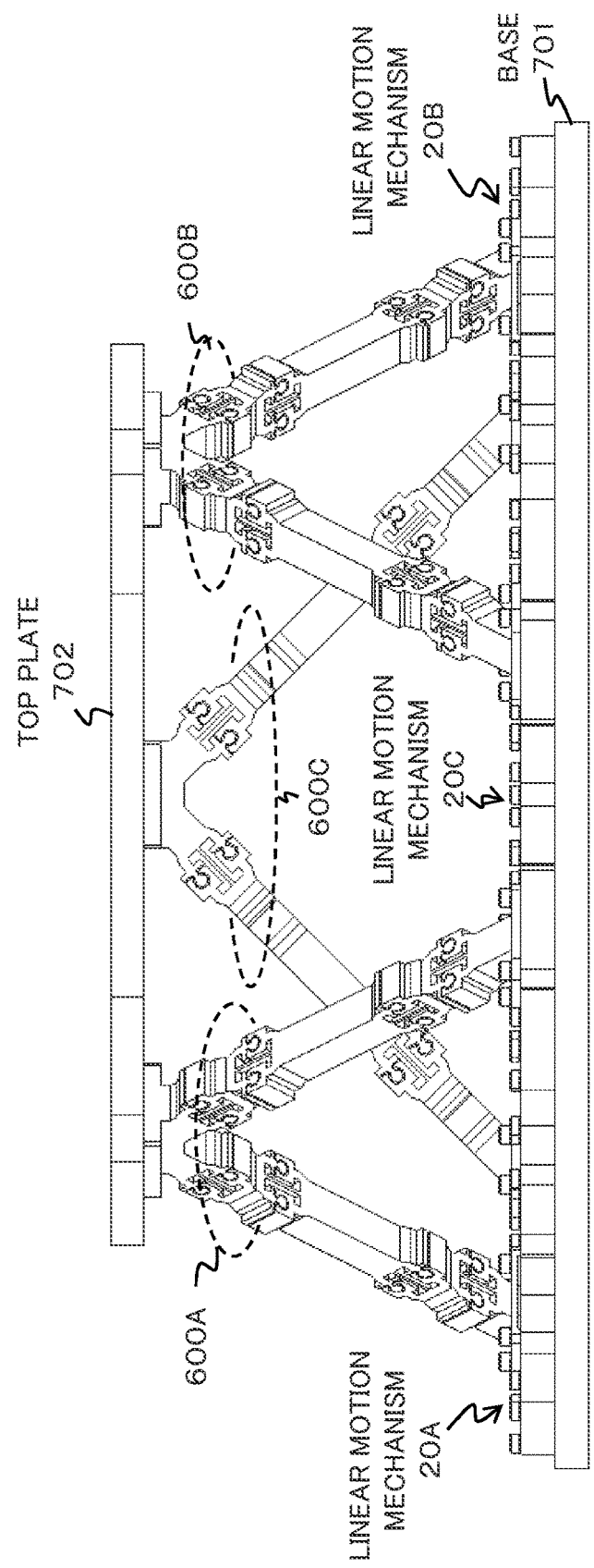
FIG. 17 is a side view illustrating a hexapod mechanism employing the limited-displacement flexible mechanism according to the second exemplary embodiment of the present invention.
Figure 18:
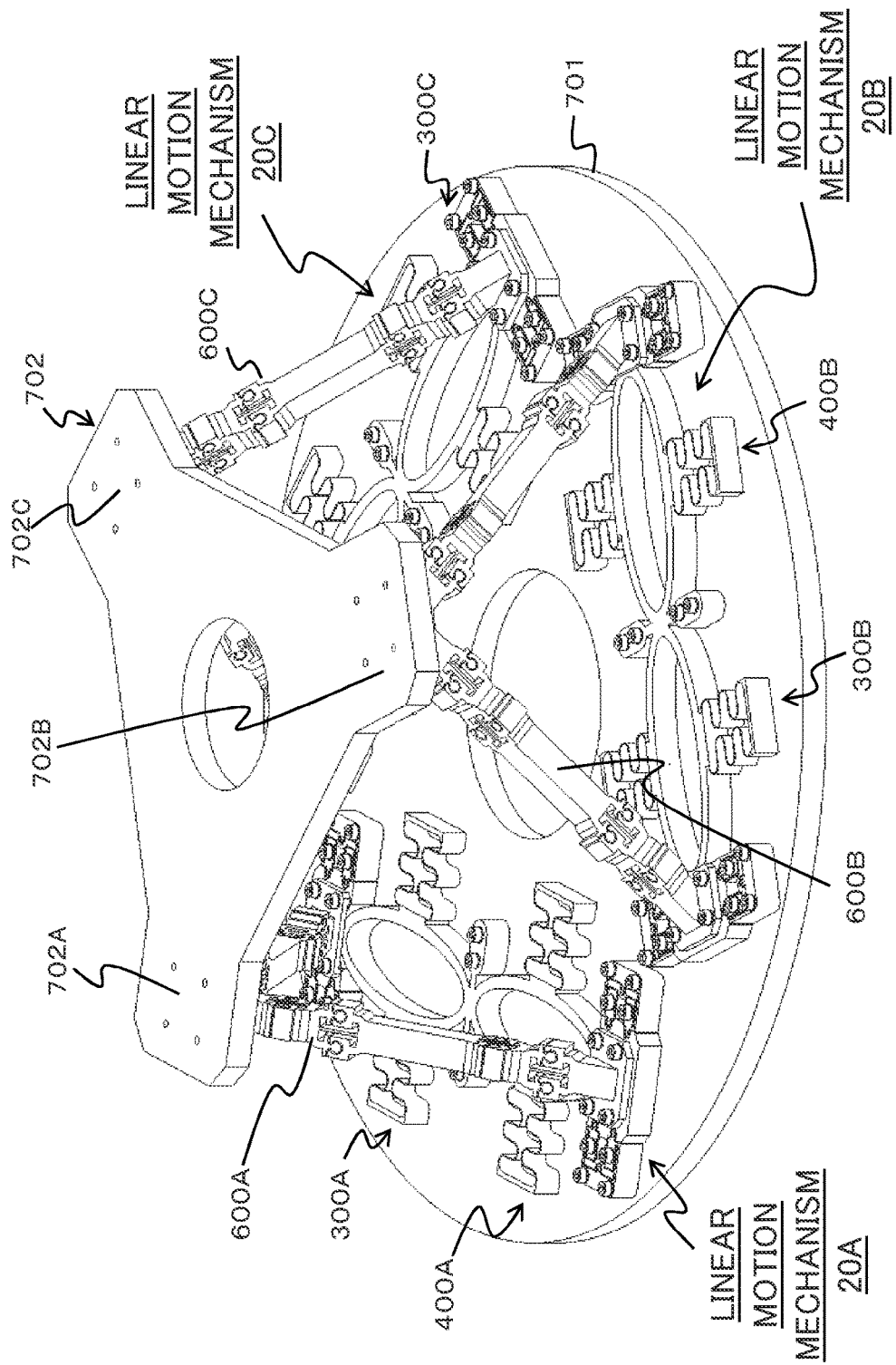
FIG. 18 is a perspective view illustrating the hexapod mechanism as shown in FIG. 17.
Figure 19:
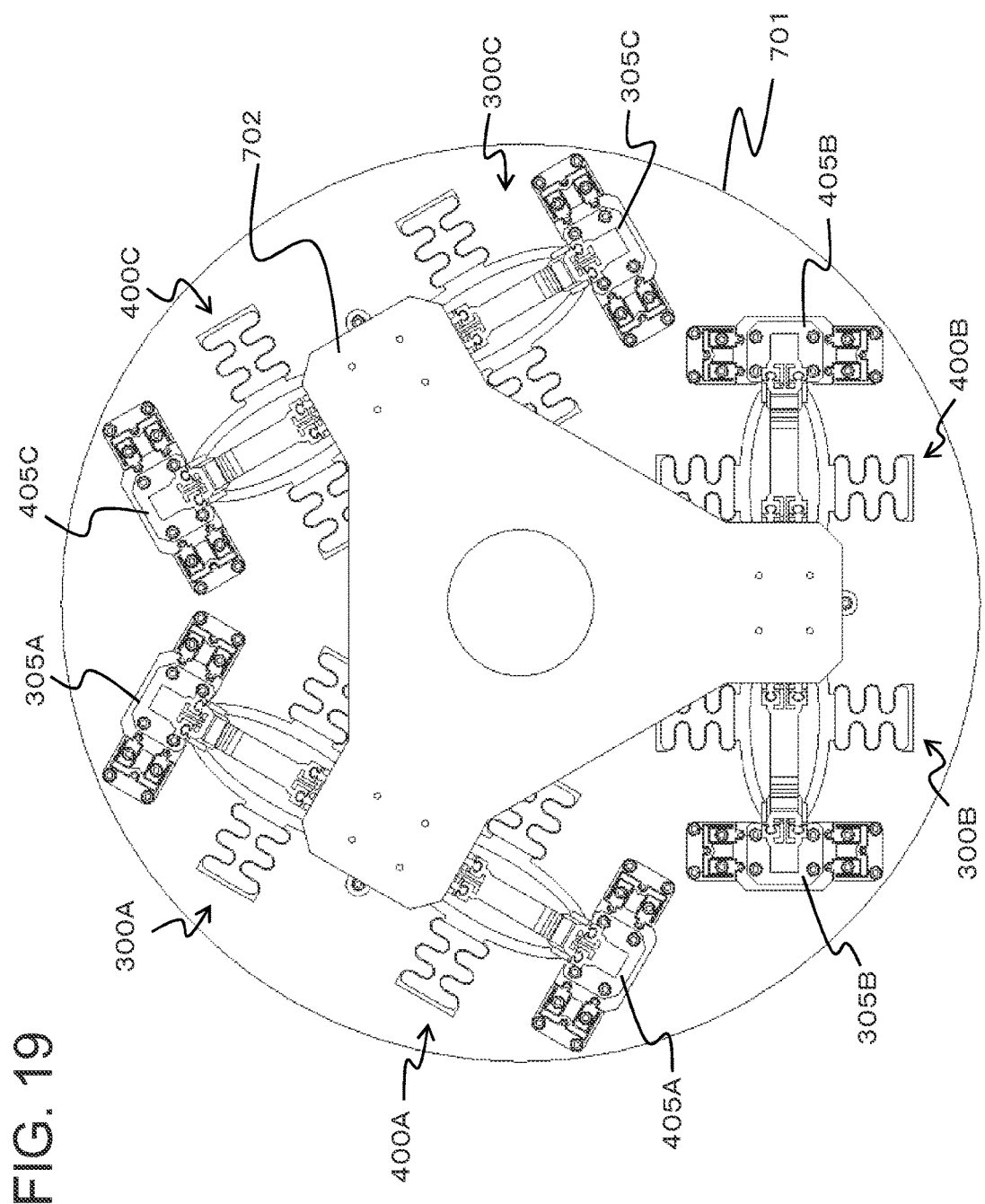
FIG. 19 is a plan view illustrating the hexapod mechanism as shown in FIG. 17.
Figure 20:
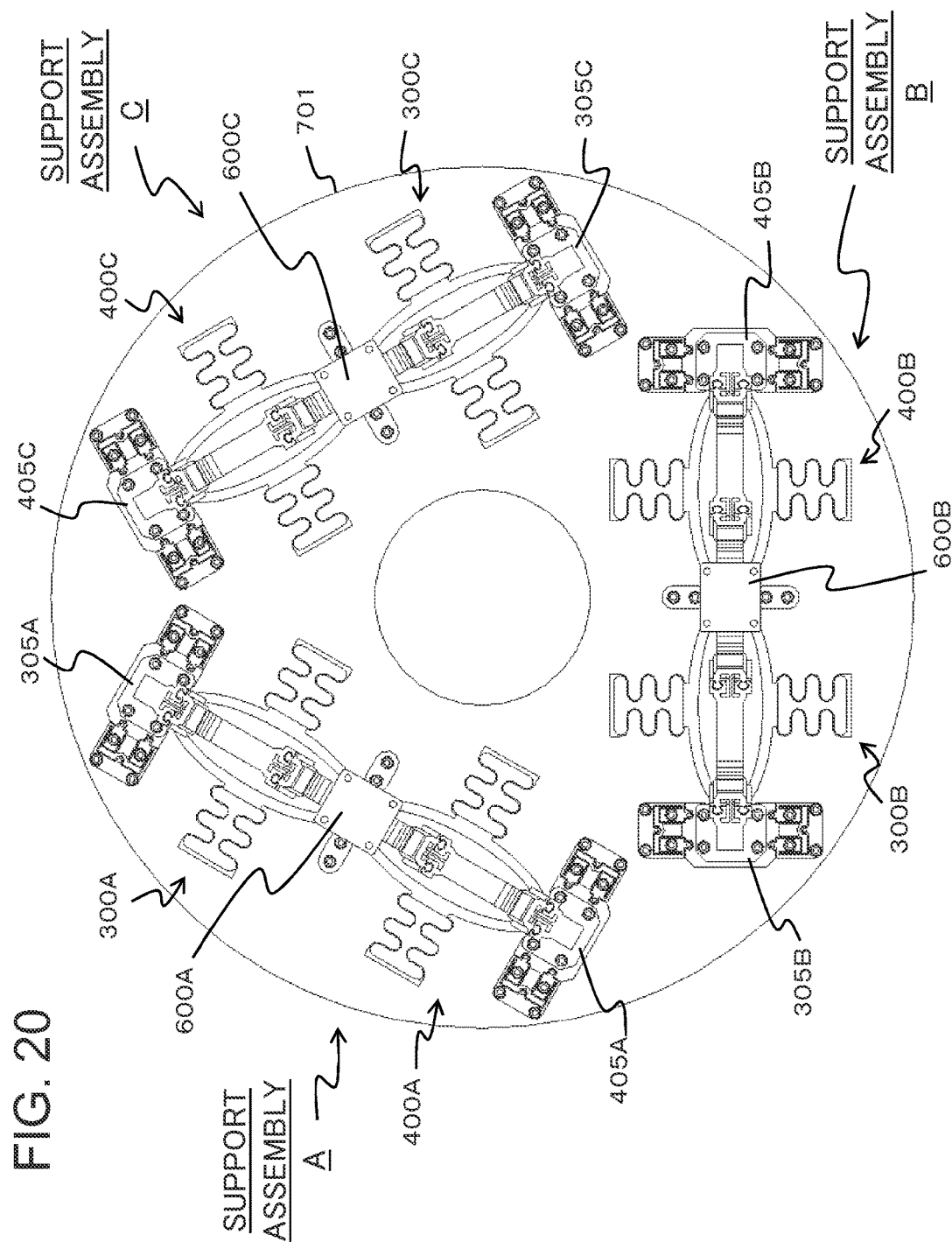
FIG. 20 is a plan view illustrating the hexapod mechanism as shown in FIG. 17 in a state such that a mounting base has been removed.

As shown in FIGS. 16C and 16D, when the operating plates 307a and 307b press/stretch the elliptical rings 301 and the operating plates 407a and 407b stretch/press the elliptical rings 401 so that the linear motion mechanism 20 moves the movable sections 305 and 405 in the same direction by the same displacement, the bipod 600 is moved as it is in the same direction by the same displacement as indicated by displacement 604 parallel to the main surface of the linear motion mechanism 20.

3.4) Production

The bipod 600 including the limited displacement flexible joint as structured above is made of elastic material with sufficient strength and may be formed integrally by using any technology such as injection molding, 3-dimentional printer or MEMS (Micro Electro Mechanical Systems).

4. Second Exemplary Embodiment 4.1) Structure

Referring to FIGS. 17-21, a hexapod arrangement having six degrees of freedom includes a base plate 701, a top plate 702 and three support assemblies A, B and C, each of which is composed of the bipod (600A, 600B, 600C) and the linear motion mechanism (20A, 20B and 20C) as shown in FIG. 8. The support assemblies A, B and C are fixed and arranged on the base plate 701 with regular-triangular configuration as typically shown in FIG. 20. The top plate 702 is fixed to the support sections of the bipods 600A, 600B and 600C. Accordingly, the top plate 702 is supported by three position-adjustable points.

As an example, the base plate 701 is circular and the top plate 702 is star-shaped. The top plate 702 may be formed of three legs 702A, 702B and 702C joined at a center point with the angle between any two adjacent legs being 120 degrees. The three legs 702A, 702B and 702C are supported respectively by the support assemblies A, B and C, as typically shown in FIG. 18. Needless to say, the top plate 702 may be circular. Further, the top plate 702 may be a mounted object requiring fine adjustment, such as optics (e.g. a mirror, prism or lens).

As described already, the linear motion mechanism 20A includes the first and second linear motion sections 300A and 400A which are capable of moving the movable sections 305A and 405A, respectively. Accordingly, as shown in FIGS. 16A-16D, the support section 603A of the bipod 600A fixed on the linear motion mechanism 20A can be moved to an arbitrary position within a limited range on a plane formed by the support rods 601A and 602A of the bipod 600A depending on the respective directions and displacements of linear motion of the movable sections 305A and 405A. It is the same with the linear motion mechanisms 20B and 20C.

4.2) Operation

Since the top plate 702 is supported by the support assemblies A, B and C, the position and/or inclination of the top plate 702 can be changed by independently controlling extension, retraction or parallel translation of linear motion of at least one of the linear motion mechanisms 20A, 20B and 20C. Hereinafter, typical operations of the hexapod arrangement will be described by referring to FIGS. 16A-16D and FIG. 18 as an example.

As shown in FIG. 16A, when the operating plates 307a and 307b and the operating plates 407a and 407b press the elliptical rings 301 and 401 respectively so that the linear motion mechanism 20 moves the movable sections 305 and 405 in the broadening directions, the height of a bipod 600 is reduced. As shown in FIG. 16B, when the operating plates 307a and 307b and the operating plates 407a and 407b stretch the elliptical rings 301 and 401 respectively so that the linear motion mechanism 20 moves the movable sections 305 and 405 in the reducing directions, the height of the bipod 600 is increased. As shown in FIGS. 16C and 16D, when the operating plates 307a and 307b press/stretch the elliptical rings 301 and the operating plates 407a and 407b stretch/press the elliptical rings 401 so that the linear motion mechanism 20 moves the movable sections 305 and 405 in the same direction by the same displacement, the bipod 600 performs parallel displacement. Accordingly, the top plate 702 can be freely moved in six directions by a combination of directions and displacements of motions provided by the respective linear motion mechanisms 20A, 20B and 20C.

It is assumed that the linear motion mechanisms 20B and 20C are not activated and only the linear motion mechanism 20A moves the movable sections 305A and 405A by the same displacement in the mutually opposite directions broadening the distance between the movable sections 305A and 405A. In this case, the height of the bipod 600A with respect to the main surface of the linear motion mechanism 20A is lowered, causing the top plate 702 to be inclined toward the leg 702A. Contrarily, when only the linear motion mechanism 20A moves the movable sections 305A and 405A by the same displacement in the mutually opposite directions reducing the distance between the movable sections 305A and 405A, the height of the bipod 600A with respect to the main surface of the linear motion mechanism 20A is increased, causing the top plate 702 to be inclined toward a center line between the legs 702B and 702C.

It is assumed that only the linear motion mechanism 20C is not activated and the linear motion mechanisms 20A and 20B are activated to move the corresponding movable sections by the same displacement in the mutually opposite directions broadening the distance between the corresponding movable sections. In this case, both of the heights of the bipods 600A and 600B are lowered, causing the top plate 702 to be inclined toward a center line between the legs 702A and 702B. Contrarily, when the linear motion mechanisms 20A and 20B are activated to move the corresponding movable sections by the same displacement in the mutually opposite directions reducing the distance between the corresponding movable sections, both of the heights of the bipods 600A and 600B become higher, causing the top plate 702 to be inclined toward the leg 702C.

It is assumed that only the linear motion mechanism 20C is not activated and the linear motion mechanisms 20A and 20B are activated to move the corresponding movable sections by the same displacement in the same direction. In this case, the top plate 702 is moved and inclined toward a center line between the legs 702A and 702B.

It is assumed that all the linear motion mechanisms 20A, 20B and 20C are activated to move the corresponding movable sections by the same displacement in the same direction, the bipods 600a, 600B and 600C are rotated, causing the top plate 702 to be rotated in the same direction by the same displacement.

The hexapod arrangement can perform fine adjustment of the top plate 702 other than the above-mentioned operations by independently controlling the linear motion mechanisms 20A, 20B and 20C.

4.3) Advantageous Effects

As described already, according to the linear motion mechanism used in the multi-degree-of-freedom adjustment mechanism employing a bipod composed of two linkage rods according to a second exemplary embodiment of the present invention, larger input displacement of the soft spring sections is transformed to smaller linear motion of the movable section according to a spring constant ratio. Accordingly, even whether the input displacement is applied to the soft spring sections with less precision, the hexapod system employing the linear motion mechanisms can move the top plate with greater precision. If the spring constant ratio is previously known, the amount of displacement of the top plate can be calculated with precision by precisely measuring the input displacement without precisely measuring the displacement of the top plate.

5. Other Applications

The present invention can be applied to high-precision measurement apparatus such as six-degree-of-freedom adjustment device which can be subject to various severe environments, such as aircrafts, spaceships and the like.

The present invention may be embodied in other specific forms without departing from the spirit or essential characteristics thereof. The above-described exemplary embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A linkage rod including a limited-displacement flexible mechanism, wherein the limited-displacement flexible mechanism comprises at least one limited-displacement flexible joint which comprises:
   a flexible member shaped like a plate, providing flexibility in a pair of opposite directions orthogonal to a longitudinal direction of the linkage rod; and
   at least one bend limitation section which is arranged in parallel with the flexible member so that the bend limitation section limits a bend of the flexible member, wherein the bend limitation section comprises:
       a first part including a protrusion at an end of the first part and a pair of first stoppers, wherein the protrusion is cylindrically shaped, wherein the pair of first stoppers protrude outside from the first part respectively in the pair of opposite directions orthogonal to the longitudinal direction of the linkage rod; and
       a second part including a pair of second stoppers each corresponding to the pair of first stoppers to form a recess between the second stoppers, wherein the recess is cylindrically shaped to be engaged with the protrusion of the first part such that the first part is relatively rotatable with respect to the second part, wherein rotation of the first part and the second part is limited by one of the first stoppers making contact with a corresponding one of the second stoppers depending on a bending direction of the flexible member.

2. The linkage rod according to claim 1, wherein at least one pair of limited-displacement flexible joints is provided such that each pair of limited-displacement flexible joints bend in both directions orthogonal to each other, respectively.

3. The linkage rod according to claim 1, wherein the linkage rod is formed integrally by using any technology including injection molding, 3-dimentional printer or MEMS (Micro Electro Mechanical Systems).

4. The linkage rod according to claim 1, wherein the flexible member is placed between two bend limitation sections so that the two bend limitation sections limits a bend of the flexible member.

5. A bipod comprising two linkage rods each including a limited-displacement flexible mechanism, wherein the limited-displacement flexible mechanism comprises at least one limited-displacement flexible joint which comprises:
   a flexible member shaped like a plate, providing flexibility in a pair of opposite directions orthogonal to a longitudinal direction of the linkage rod; and
   at least one bend limitation section which is arranged in parallel with the flexible member so that the bend limitation section limits a bend of the flexible member, wherein the bend limitation section comprises:
       a first part including a protrusion at an end of the first part and a pair of first stoppers, wherein the protrusion is cylindrically shaped, wherein the pair of first stoppers protrude outside from the first part respectively in the pair of opposite directions orthogonal to the longitudinal direction of the linkage rod; and
       a second part including a pair of second stoppers each corresponding to the pair of first stoppers to form a recess between the second stoppers, wherein the recess is cylindrically shaped to be engaged with the protrusion of the first part such that the first part is relatively rotatable with respect to the second part, wherein rotation of the first part and the second part is limited by one of the first stoppers making contact with a corresponding one of the second stoppers depending on a bending direction of the flexible member.

6. The bipod according to claim 5, wherein the bipod is formed integrally by using any technology including injection molding, 3-dimentional printer or MEMS (Micro Electro Mechanical Systems).

7. The bipod according to claim 5, wherein the flexible member is placed between two bend limitation sections so that the two bend limitation sections limits a bend of the flexible member.

8. The bipod according to claim 5, wherein the two linkage rods are fixed at one end of each linkage rod to form a reverse-V shape.

* * * * *